(12) United States Patent  (10) Patent No.: US 7,827,198 B2
Narahara et al.  (45) Date of Patent: Nov. 2, 2010

(54) INFORMATION PROCESSING APPARATUS AND METHOD, AND PROGRAM

(75) Inventors: Tatsuya Narahara, Kanagawa (JP); Akihiro Watanabe, Kanagawa (JP)

(73) Assignee: Sony Corporation, Tokyo (JP)

( * ) Notice: Subject to any disclaimer, the term of this patent is extended or adjusted under 35 U.S.C. 154(b) by 244 days.

(21) Appl. No.: 11/900,380

(22) Filed: Sep. 11, 2007

(65) Prior Publication Data

US 2008/0183697 A1    Jul. 31, 2008

(30) Foreign Application Priority Data

Sep. 12, 2006    (JP) .............................. 2006-246876

(51) Int. Cl.
    G06F 7/06    (2006.01)
    G06F 17/30    (2006.01)
(52) U.S. Cl. .................. 707/791; 707/749; 707/794; 707/802
(58) Field of Classification Search .................. 707/100, 707/791
    See application file for complete search history.

(56) References Cited

U.S. PATENT DOCUMENTS

| | | | | |
|---|---|---|---|---|
| 6,385,619 | B1* | 5/2002 | Eichstaedt et al. | 707/104.1 |
| 6,393,427 | B1* | 5/2002 | Vu et al. | 707/101 |
| 6,446,083 | B1* | 9/2002 | Leight et al. | 707/104.1 |
| 7,003,519 | B1* | 2/2006 | Biettron et al. | 1/1 |
| 7,062,498 | B2* | 6/2006 | Al-Kofahi et al. | 707/101 |
| 7,370,059 | B2* | 5/2008 | Geraud | 707/102 |
| 7,567,961 | B2* | 7/2009 | Yang-Stephens et al. | 707/5 |
| 2003/0154180 | A1* | 8/2003 | Case et al. | 707/1 |
| 2005/0240572 | A1* | 10/2005 | Sung et al. | 707/3 |
| 2006/0010129 | A1* | 1/2006 | Numata | 707/6 |
| 2006/0282442 | A1* | 12/2006 | Lennon et al. | 707/100 |
| 2007/0271291 | A1* | 11/2007 | Acharya | 707/102 |

\* cited by examiner

*Primary Examiner*—Don Wong
*Assistant Examiner*—Binh V Ho
(74) *Attorney, Agent, or Firm*—Frommer Lawrence & Haug LLP; William S. Frommer; Thomas F. Presson

(57) ABSTRACT

An information processing apparatus including an identifying unit that identifies a group to which content belongs from one or more predetermined groups based on metadata describing descriptions of the content; and a clustering unit that clusters a first set of the contents that is not identified and classifying the first set into a cluster based on the metadata.

7 Claims, 20 Drawing Sheets

FIG. 3

| IDENTIFIER WORD | IDENTIFICATION COEFFICIENT | | | |
| --- | --- | --- | --- | --- |
| | NEWS | ECONOMY | STOCKS | ENTERTAINMENT VARIETY ENTERTAINMENT |
| BUSINESS | 5 | 10 | 7 | 5 |
| ECONOMY | 5 | 10 | 7 | 5 |
| NEWS | 10 | 5 | 5 | 5 |
| ANCHOR | 10 | -10 | -10 | -10 |
| REPORT | 5 | 5 | 5 | 5 |
| SCOOP | 5 | 0 | 0 | 5 |
| POLITICS | 5 | -5 | 0 | 5 |
| WEATHER FORECAST | 10 | -10 | -10 | 7 |
| TOPICS | 5 | 5 | 5 | 7 |
| MEDIA | 10 | 0 | 0 | 10 |
| INCIDENT | 7 | -7 | -7 | 10 |
| DRAMA | -10 | -10 | -10 | 10 |
| FEATURE | -10 | -10 | -10 | -10 |
| PRODUCER | -10 | -10 | -10 | -10 |
| ENTERTAINMENT | -10 | -10 | -10 | 10 |
| CASTER | 10 | 10 | 10 | -10 |
| MOVIE | -10 | -10 | -10 | 10 |
| WEATHER FORECAST | 7 | -10 | 0 | 0 |
| ... | ... | ... | ... | ... |

FIG. 11

| IDENTIFIER WORD | IDENTIFICATION COEFFICIENT | | | |
|---|---|---|---|---|
| | NEWS | ECONOMY | STOCKS | ENTERTAINMENT VARIETY |
| BUSINESS | 5 | 10 | 7 | 5 |
| ECONOMY | 5 | 10 | 7 | 5 |
| NEWS | 10 | 5 | 5 | 5 |
| ANCHOR | 10 | -10 | -10 | -10 |
| REPORT | 5 | 5 | 5 | 5 |
| SCOOP | 5 | 0 | 0 | 5 |
| POLITICS | 5 | -5 | 0 | 5 |
| WEATHER FORECAST | 10 | -10 | -10 | 7 |
| TOPICS | 5 | 5 | 5 | 7 |
| MEDIA | 10 | 0 | 0 | 10 |
| INCIDENT | 7 | -7 | -7 | 10 |
| DRAMA | -10 | -10 | -10 | 10 |
| FEATURE | -10 | -10 | -10 | -10 |
| PRODUCER | -10 | -10 | -10 | -10 |
| ENTERTAINMENT | -10 | -10 | -10 | 10 |
| CASTER | 10 | 10 | 10 | 10 |
| MOVIE | -10 | -10 | -10 | 10 |
| WEATHER FORECAST | 7 | -10 | 0 | 0 |
| ... | ... | ... | ... | ... |

INFORMATION PROCESSING APPARATUS AND METHOD, AND PROGRAM

CROSS REFERENCES TO RELATED APPLICATIONS

The present invention contains subject matter related to Japanese Patent Application JP 2006-246876 filed in the Japanese Patent Office on Sep. 12, 2006, the entire contents of which being incorporated herein by reference.

BACKGROUND OF THE INVENTION

1. Field of the Invention

The present invention relates to an information processing apparatus and method and a program, particularly to an information processing apparatus and method and a program which can retrieve desired contents easily.

2. Description of the Related Art

Heretofore, contents are retrieved based on keywords.

For example, JP-A-2005-115790 (Patent Reference 1) discloses a technique in which broadcast programs are displayed, keywords relating to the displayed broadcast programs are extracted, contents such as Web pages are retrieved from a list of the extracted keywords based on the keywords selected by a user, and predetermined contents obtained as the search result are displayed.

SUMMARY OF THE INVENTION

In association with the proliferation of digital broadcasting and the Internet, it is made possible today that an enormous number of contents are obtained through broadcast waves and the Internet, which causes an increasing number of contents presented as the search result and the difficulty of retrieving desired contents from the search result.

Thus, it is desirable to retrieve desired contents easily.

An information processing apparatus according to an embodiment of the invention is an information processing apparatus including: an identifying means for identifying a group to which a content belongs from predetermined groups based on metadata describing descriptions of a content; and a clustering means for clustering a first set that is a set of the contents whose belonging group is not identified and classifying the first set into a cluster based on the metadata.

In the information processing apparatus, the clustering means may cluster a second set that is a set of the contents belonging to the selected group or the cluster to classify the second set into a cluster.

The information processing apparatus may further include a retrieving means for retrieving a related content that is the content relating to the content that is a base point for retrieval based on the metadata, wherein the identifying means identifying the group to which the related content belongs.

The information processing apparatus may further include a presentation control means for controlling the presentation of the contents so that the contents are classified and presented by each of the groups and the clusters.

An information processing method or a program according to an embodiment of the invention is an information processing method or a program including the steps of: identifying a group to which a content belongs from predetermined groups based on metadata describing descriptions of a content; and clustering a set of the contents whose belonging group is not identified and classifying the set into a cluster based on the metadata.

In an embodiment of the invention, a group is identified to which a content belongs from predetermined groups based on metadata describing descriptions of a content; and a set of the contents whose belonging group is not identified is clustered and classifying the set into a cluster based on the metadata.

As described above, according to an embodiment of the invention, contents can be classified. In addition, according to an embodiment of the invention, desired contents can be easily retrieved.

BRIEF DESCRIPTION OF THE DRAWINGS

FIG. 3 shows a diagram depicting an exemplary identification coefficient table;

FIG. 11 shows a diagram illustrative of a search method of the related classes;

DETAILED DESCRIPTION OF THE INVENTION

Hereinafter, an embodiment of the invention will be described. The following is examples of the correspondence between configuration requirements for the invention and the embodiments of the specification or the drawings. This is described for confirming that the embodiments supporting the invention are described in the specification or the drawings. Therefore, even though there is an embodiment that is described in the specification or the drawings but is not described herein as an embodiment corresponding to configuration requirements for the invention, it does not mean that the embodiment does not correspond to those configuration requirements. Contrary to this, even though an embodiment is described herein as an embodiment corresponding to configuration requirements, it does not mean that the embodiment does not correspond to configuration requirements other than those configuration requirements.

Figure 1:
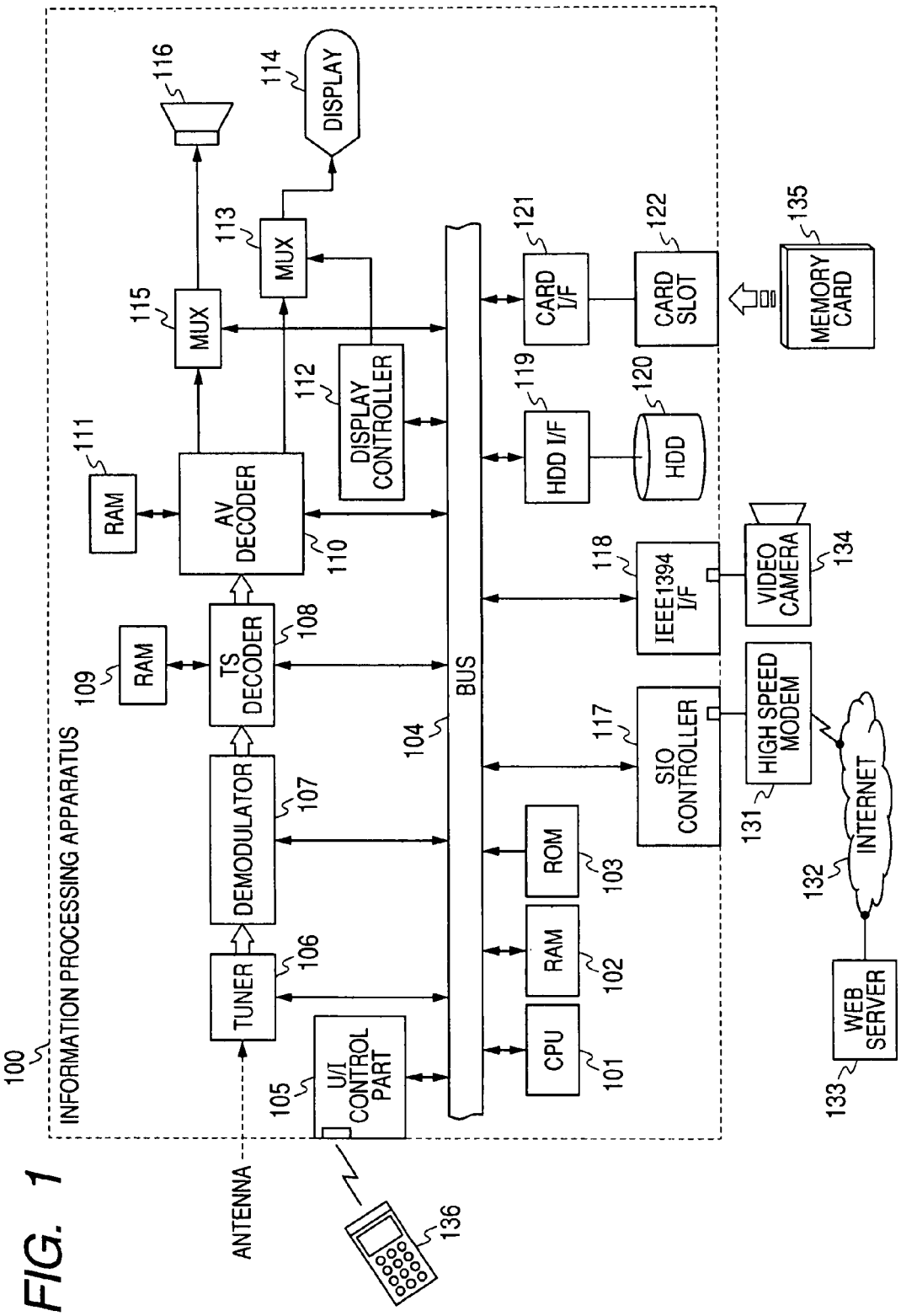
FIG. 1 shows a block diagram depicting an information processing apparatus to which an embodiment of the invention is applied.
Figure 4:
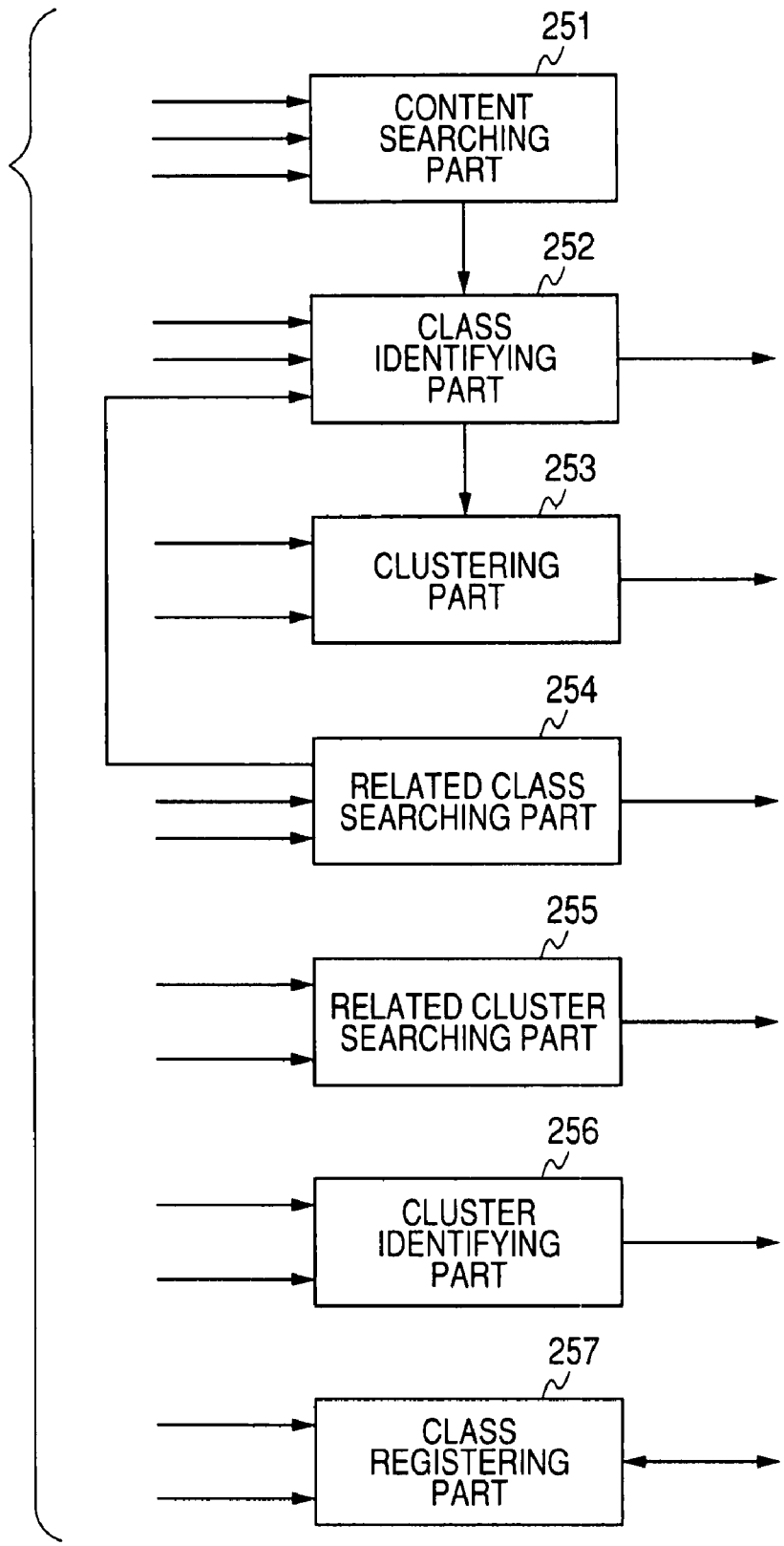
FIG. 4 shows a block diagram depicting the detail of a content search processing part shown in FIG. 2.

First, an information processing apparatus according to an embodiment of the invention (for example, an information processing apparatus 100 shown in FIG. 1) includes: an identifying means for identifying a group to which a content belongs from predetermined groups based on metadata describing descriptions of a content (for example, a class identifying part 252 shown in FIG. 4); and a clustering means for clustering a first set that is a set of the contents whose belonging group is not identified and classifying the first set into a cluster based on the metadata (for example, a clustering part 253 shown in FIG. 4).

Secondly, an information processing apparatus according to an embodiment of the invention further includes a retrieving means for retrieving a related content that is the content relating to the content that is a base point for retrieval based on the metadata (for example, a content searching part 251 shown in FIG. 4), wherein the identifying means identifying the group to which the related content belongs.

Figure 2:
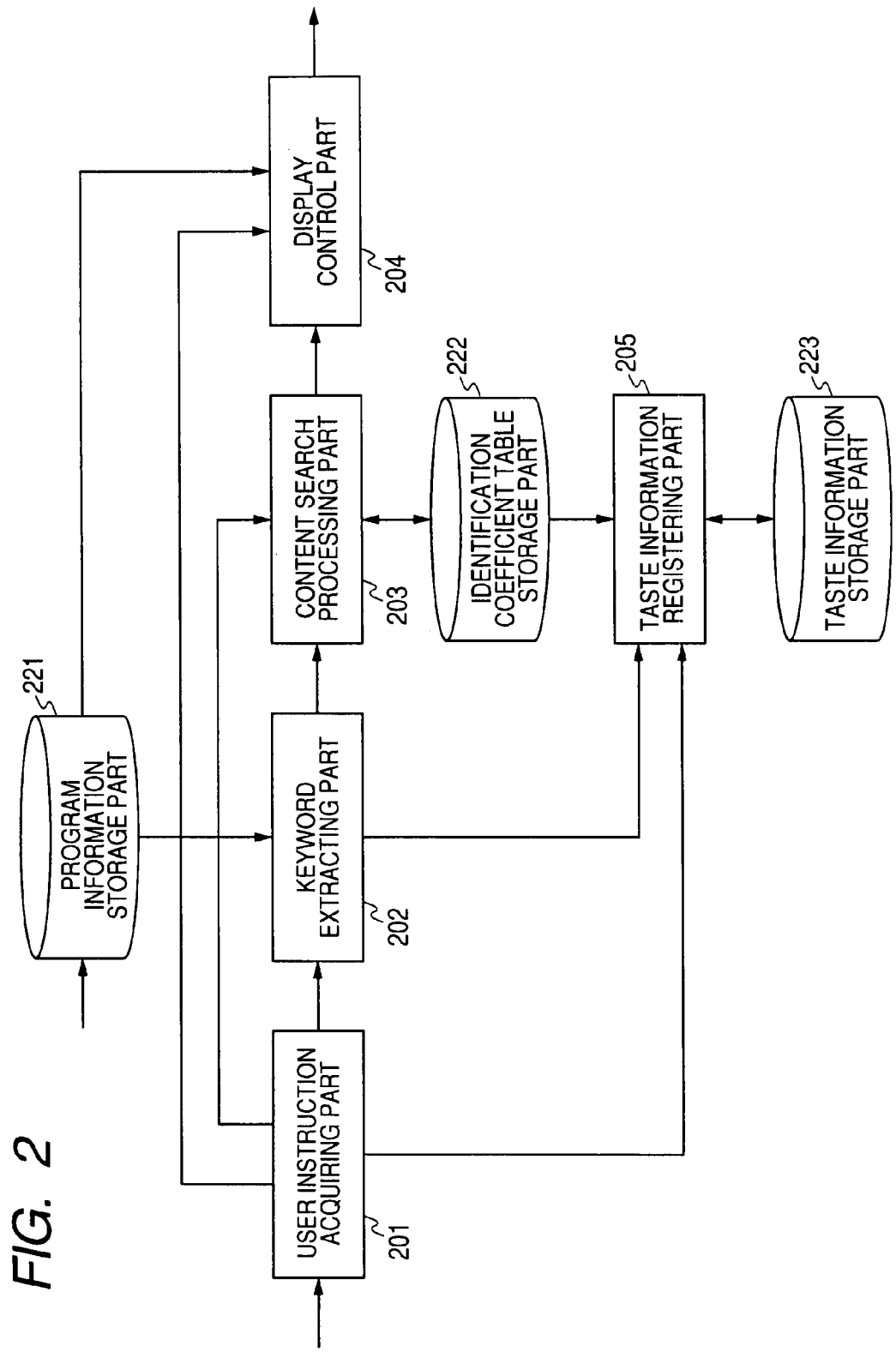
FIG. 2 shows a block diagram partially depicting the functional configuration of the information processing apparatus shown in FIG. 1.

Thirdly, an information processing apparatus according to an embodiment of the invention further includes a presentation control means for controlling the presentation of the contents so that the contents are classified and presented by each of the groups and the clusters (for example, a display control part 204 shown in FIG. 2).

Figure 5:
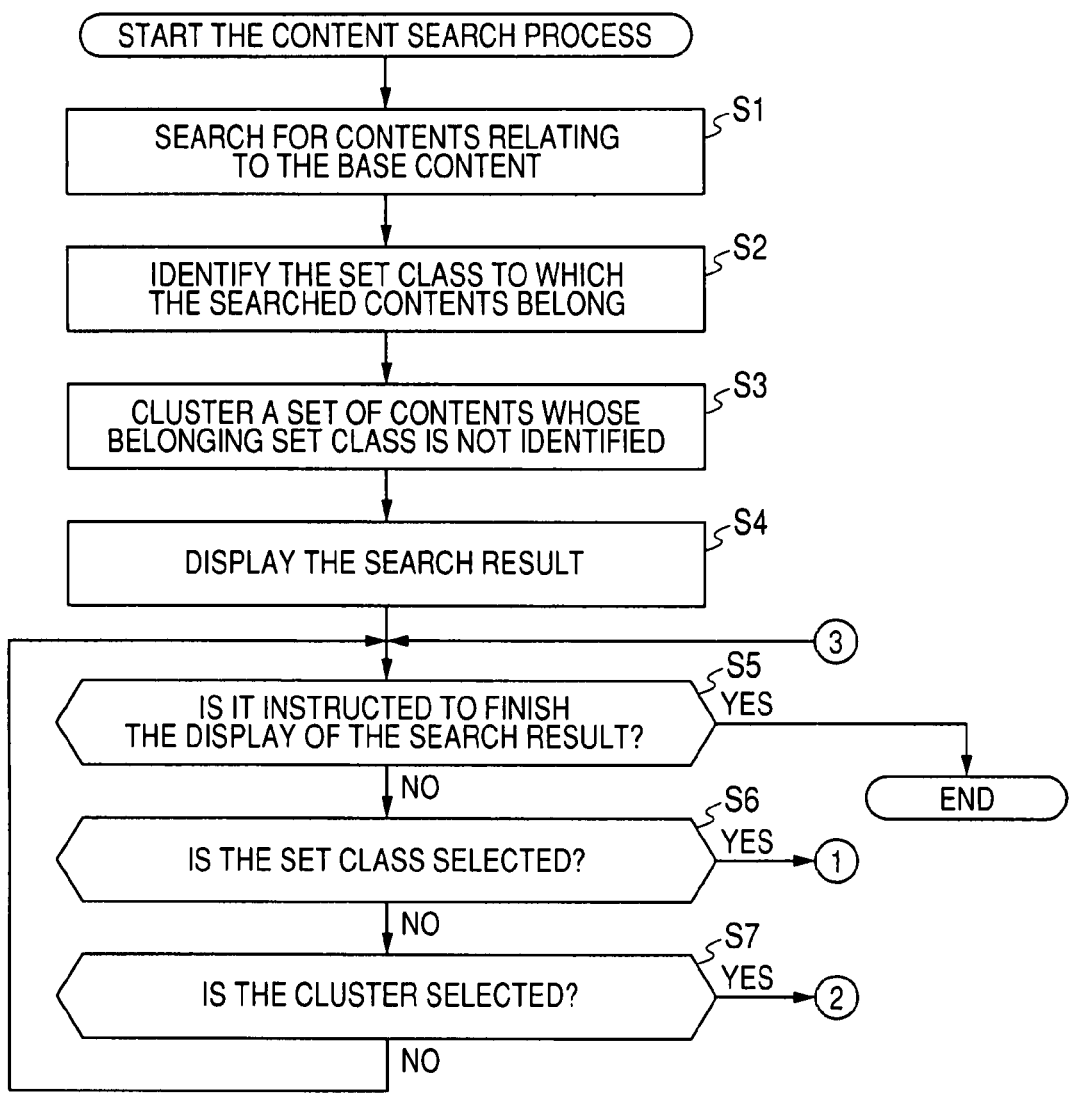
FIG. 5 shows a flowchart illustrative of a content search process performed by the information processing apparatus.

An information processing method or a program according to an embodiment of the invention is an information processing method or a program includes the steps of: identifying a group to which a content belongs from predetermined groups based on metadata describing descriptions of a content (for example, Step S2 shown in FIG. 5); and clustering a set of the contents whose belonging group is not identified and classifying the set into a cluster based on the metadata (for example, Step S3 shown in FIG. 5).

Hereinafter, an embodiment of the invention will be described with reference to the drawings.

FIG. 1 shows a block diagram depicting an embodiment of the hardware configuration of an information processing apparatus to which an embodiment of the invention is applied.

An information processing apparatus 100 is a television receiver having a HDD (Hard Disk Drive) incorporated therein, which outputs images and sounds of a broadcast program from a display 114 and a speaker 116 as well as properly acquires data of the broadcast program from broadcast waves received through an antenna, not shown, and stores the acquired data of the broadcast program in the HDD (the apparatus records the broadcast program).

The information processing apparatus 100 also has a function that acquires a broadcast EPG (Electronic Program Guide), or acquires an EPG by downloading it from a predetermined server connected through the Internet. For each of broadcast programs, the EPG contains the title, genre, broadcast date and time, and cast of the broadcast program, the outline of the broadcast program, and broadcast program information about its broadcast station.

In addition, the information processing apparatus 100 is connected to a network, and has a function that receives information in the RSS (Resource Description Framework Site Summary) format which is distributed from newspaper sites and various portal sites which are registered by a user in advance, and acquires news stories and comments. In other words, the information processing apparatus 100 is mounted with an RSS Reader which reads information in the RSS format.

A CPU (Central Processing Unit) 101 executes a program stored in a ROM (Read Only Memory) 103 and a program loaded from a HDD 120 to a RAM (Random Access Memory) 102 through a HDD I/F 121 and a bus 104. For example, it controls the operations of the individual parts in response to an instruction sent from a user and received by a U/I control part 105, that is, a command from a remote controller 136.

In addition, for the CPU 101, such a cell can be adopted that is described in "Cell tanjo", Nikkei electronics, Nikkei Business Publications Inc., Feb. 28, 2005, pp. 89 to 117.

Under control done by the CPU 101, a tuner 106 receives broadcast signals from the antenna, not shown, and outputs the received signals to a demodulator 107.

The demodulator 107 demodulates the received signals supplied from the tuner 106, and outputs transport streams that have been broadcast over a predetermined channel to a TS decoder 108.

Under control done by the CPU 101, the TS decoder 108 uses a RAM 109 to extract a predetermined stream from the transport streams supplied from the demodulator 107, and outputs a packet configuring the extracted stream on the bus 104, or to an AV decoder 110. For example, the packet (data of the broadcast program) supplied on the bus 104 is supplied through the HDD I/F 121 and stored in the HDD 120. In addition, the EPG obtained by the TS decoder 108 is also properly supplied and stored in the HDD 120.

The AV decoder 110 uses the RAM 111 to decode video data (video packet) and audio data (audio packet) supplied from the TS decoder 108, and outputs video signals decoded and obtained to a MUX 113 and audio signals to a MUX 115.

Under control done by the CPU 101, a display controller 112 generates video signals to display various images on a display 114, and outputs the generated video signals to the MUX 113.

The MUX 113 displays various screens and images such as screens of broadcast programs and RSS stories and various operation screens on the display 114 based on the video signals supplied from the AV decoder 110 and the video signals (OSD (On Screen Display) signals) supplied from the display controller 112.

The MUX 115 outputs sounds corresponding to the audio signals supplied from the AV decoder 110 through a speaker 116.

An SIO (Serial I/O) controller 117 controls a high speed modem 131 to connect to a Web server 133 through the Internet 132, and downloads the EPG, for example, as necessary. The EPG obtained by downloading it is supplied and stored in the HDD 120. In addition, the SIO controller 117 makes access to sites of distributing RSS stories registered by a user, and receives RSS stories. The RSS stories received and obtained are also supplied and stored in the HDD 120.

An IEEE (Institute of Electrical and Electronics Engineers) 1394 I/F 118 captures video data from a video camera 134 connected through an IEEE 1394 cable.

The HDD I/F 121 stores data supplied through the bus 104 in the HDD 120 as well as supplies data stored in the HDD 120 through the bus 104 in response to a request.

The card I/F 121 records data supplied through the bus 104 on a memory card 135 mounted on a card slot 122, reads data recorded in the memory card 135, and outputs them on the bus 104.

In addition, hereinafter, the broadcast program that is a target for processing by the information processing apparatus 100 is also referred to as contents.

FIG. 2 shows a block diagram partially depicting the functional configuration of the information processing apparatus 100. At least a part of the functional parts shown in FIG. 2 is implemented by executing a predetermined program by means of the CPU 101 shown in FIG. 1.

From the viewpoint of the functional configuration, the information processing apparatus 100 is configured to include a user instruction acquiring part 201, a keyword extracting part 202, a content search processing part 203, a display control part 204, a taste information registering part 205, a broadcast program information storage part 221, an identification coefficient table storage part 222, and a taste information storage part 223.

Through the U/I control part 105, the user instruction acquiring part 201 acquires various instructions inputted by a user through the remote controller 136. The user instruction acquiring part 201 supplies information indicating the descriptions of the acquired instruction to the keyword extracting part 202, the content search processing part 203, the display control part 204, or the taste information registering part 205, as necessary.

Figure 6:
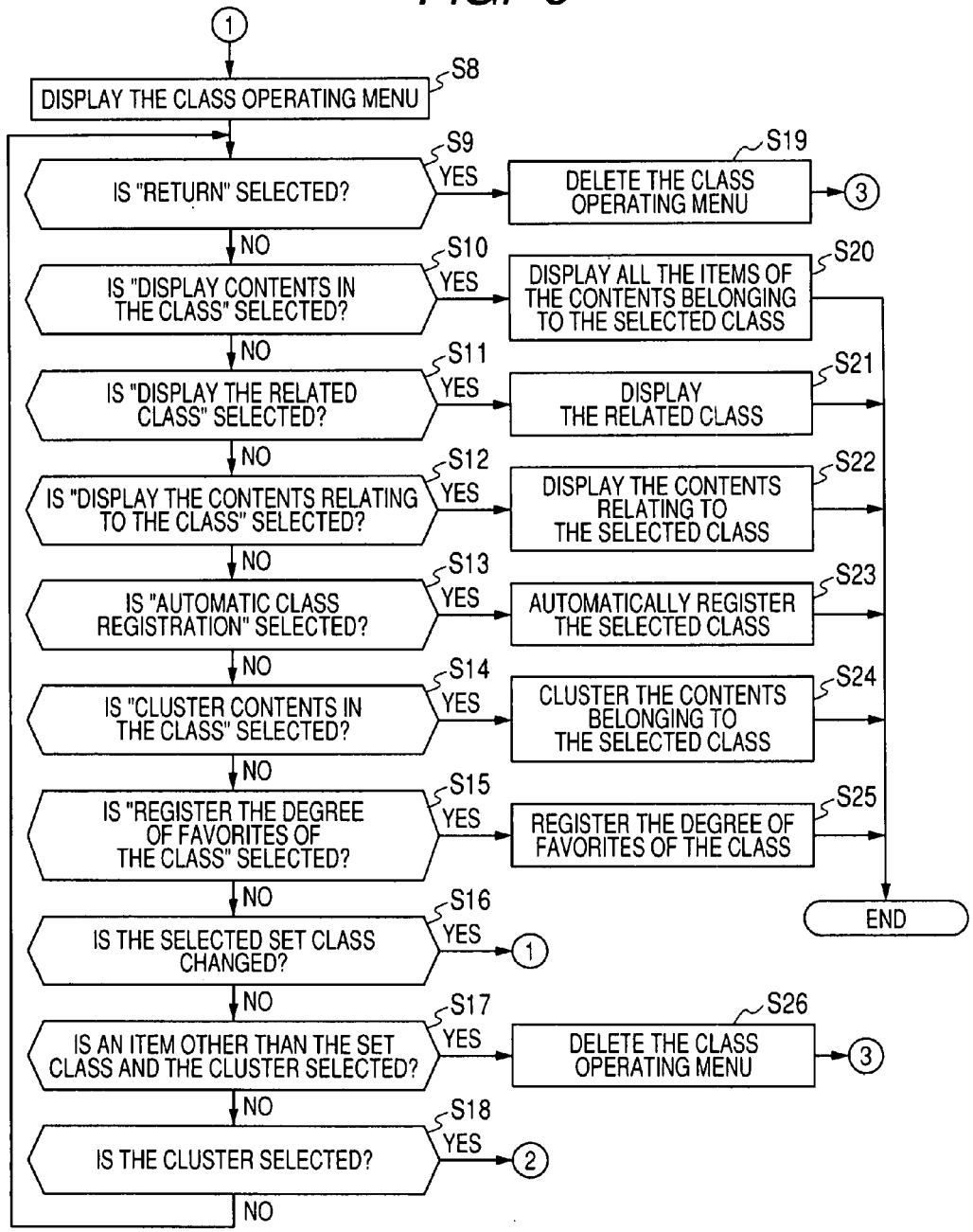
FIG. 6 shows a flow chart illustrative of the content search process performed by the information processing apparatus.
Figure 7:
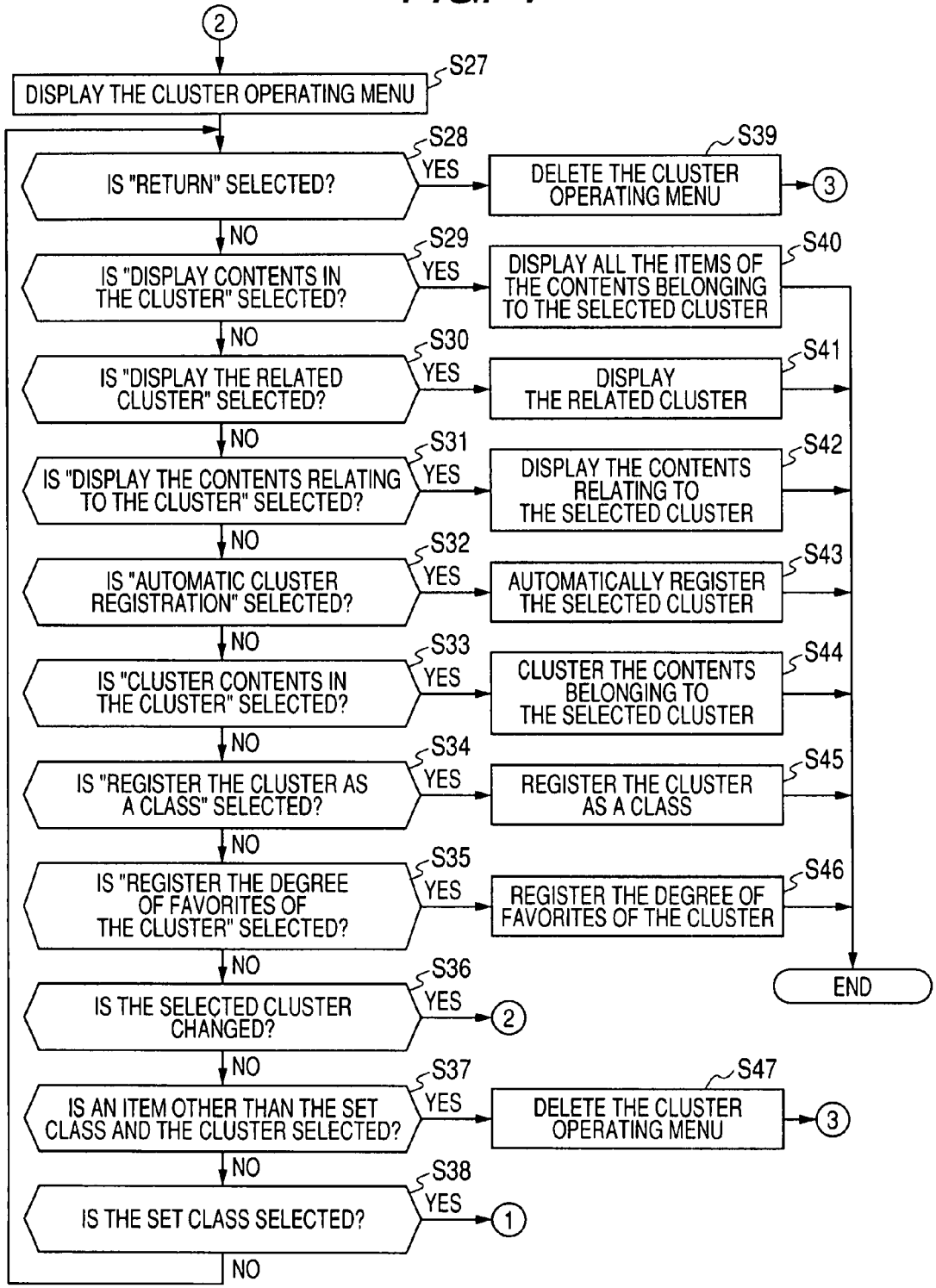
FIG. 7 shows a flow chart illustrative of the content search process performed by the information processing apparatus.

As described later with reference to FIGS. 5 to 7, the keyword extracting part 202 reads broadcast program information that is metadata indicating the descriptions of the individual contents out of the broadcast program information storage part 221, and extracts a keyword relating to each of the contents. The keyword extracting part 202 sets a score of the keywords each extracted for the individual contents. Here, the term score is a value that indicates the significance of each of the keywords in the individual contents. In other words, it is a value that indicates a degree of the characteristics of the individual contents expressed by each keyword. The keyword extracting part 202 supplies information indicating the extracted keywords and the scores set to each of the keywords to the content search processing part 203 or the taste information registering part 205, as necessary.

In addition, hereinafter, a keyword relating to a certain content is simply expressed as a keyword of the content properly.

As described later with reference to FIGS. 5 to 7, the content search processing part 203 uses an identification coefficient table stored in the identification coefficient table storage part 222 to retrieve and classify contents, and supplies information indicating the results to the display control part 204. In addition, the content search processing part 203 updates the identification coefficient table stored in the identification coefficient table storage part 222.

FIG. 3 shows a diagram depicting an exemplary identification coefficient table. The identification coefficient table is a table that is used for identifying a set class to which the individual contents belong, showing the relation between an identifier word and an identification coefficient in each of the set classes.

In addition, here, the term set class is a group that is predefined for classifying contents, and that adopts a genre such as sports and music as a set class.

The term identifier word is a keyword that is used for identifying a set class to which contents belong.

The term identification coefficient is a weight that is set to the individual identifier words in each of the set classes in accordance with a relevance ratio to a set class. An identifier word with a greater identification coefficient has a higher relevance ratio to its set class, whereas an identifier word with a smaller identification coefficient has a smaller relevance ratio to its set class. In other words, an identifier word with a greater identification coefficient expresses a characteristic of its set class more noticeably. In addition, an identification coefficient of a negative value is sometimes set to the identifier word that expresses a characteristic different from the characteristic of the set class. For example, in the example shown in FIG. 3, "weather forecast" is an identifier word, its relevance ratio for "news" in the set class is set to 10, and its relevance ratio for "economy" in the set class is set to −10. In other words, "weather forecast" noticeably expresses the characteristic of the set class of "news", and "weather forecast" is also registered in the identification coefficient table as the identifier word that expresses a characteristic different from the characteristic of the set class of "economy".

Returning to FIG. 2, in response to a user instruction, the display control part 204 controls the display controller 112 while using broadcast program information stored in the broadcast program information storage part 221, whereby it displays the processed result done by the content search processing part 203 on the display 114.

The taste information registering part 205 registers and updates taste information stored in the taste information storage part 223 based on user instructions, the history of user manipulations for contents, or the identification coefficient table stored in the identification coefficient table storage part 222.

In addition, to taste information, the keywords specified by a user and the keywords extracted based on the history of user manipulations for contents are registered in association with the degree of tastes that indicates the degree of tastes of a user to each of the keywords. Then, for example, such a process is performed that keywords registered in the taste information are used to automatically record the contents including a keyword with a high degree of tastes to broadcast program information, or displays the contents in higher priority.

In addition, to taste information, the degree of tastes of a user to each of the set classes is registered based on the user instruction and the history of user manipulations for contents. Then, for example, such a process is performed that the degree of tastes to each of the set classes is used to automatically record the contents belonging to the set class with a higher, or displays the contents in higher priority.

The broadcast program information storage part 221 properly accumulates therein broadcast program information acquired by the information processing apparatus 100.

The identification coefficient table storage part 222 accumulates therein the identification coefficient table described above.

The taste information storage part 223 accumulates therein taste information described above.

In addition, for example, the broadcast program information storage part 221, the identification coefficient table storage part 222, and the taste information storage part 223 are provided in the HDD 120 shown in FIG. 1.

FIG. 4 shows a block diagram depicting the detail of the content search processing part 203 shown in FIG. 2. The content search processing part 203 is configured to include a content searching part 251, a class identifying part 252, a clustering part 253, a related class searching part 254, a related cluster searching part 255, a cluster identifying part 256, and a class registering part 257.

The content searching part 251 acquires information indicating the descriptions of the user instruction from the user instruction acquiring part 201. In addition, the content searching part 251 acquires information indicating the keywords of the individual contents and the score of each of the keywords from the keyword extracting part 202. Moreover, as described later with reference to FIGS. 5 to 7, the content searching part 251 uses the identification coefficient table stored in the identification coefficient table storage part 222 to retrieve contents relating to the content that is a base point for the search specified by a user (hereinafter, referred to as a base content). The content searching part 251 instructs the class identifying part 252 to identify the set classes to which the retrieved contents belong.

The class identifying part 252 acquires information indicating the descriptions of the user instruction from the user instruction acquiring part 201. In addition, the class identifying part 252 acquires information indicating the keywords of the individual contents and the score of each of the keywords from the keyword extracting part 202. Moreover, as described later with reference to FIGS. 5 to 7, the class identifying part 252 identifies the set classes to which the contents belong, the contents being retrieved by the content searching part 251. The class identifying part 252 supplies information indicating the identified result to the display control part 204. In addition, the class identifying part 252 instructs the clustering part 253 to cluster a set of the contents whose belonging class is not identified. In addition, the class identifying part 252 computes the relevance ratio of the base content to each of the set classes, and supplies information indicating the computed relevance ratio to the display control part 204.

Moreover, as described later with reference to FIGS. 5 to 7, the class identifying part 252 retrieves the contents relating to the set class selected by a user (hereinafter, referred to as a selected class). The class identifying part 252 supplies information indicating the contents relating to the selected class and the relevance ratio of the contents to the selected class to the display control part 204.

In addition, as described later with reference to FIGS. 5 to 7, the class identifying part 252 retrieves the contents belonging to the set class relating to the selected class selected by a user (hereinafter, referred to as a related class). The class identifying part 252 supplies information indicating the contents belonging to the related class to the display control part 204.

The clustering part 253 acquires information indicating the descriptions of the user instruction from the user instruction acquiring part 201. In addition, the clustering part 253 acquires information indicating the keywords of the individual contents and the score of each of the keywords from the keyword extracting part 202. Moreover, the class identifying part 252 clusters a set of the contents whose belonging class is not identified, or a set of the contents specified by a user, and classifies the set of the contents into clusters. In addition, the clustering part 253 extracts keywords indicating the characteristics of the individual clusters, and sets the keywords to the cluster names of the individual clusters. Moreover, the clustering part 253 supplies information indicating the contents belonging to the individual clusters and the cluster names of the individual clusters to the display control part 204.

The related class searching part 254 acquires information indicating the descriptions of the user instruction from the user instruction acquiring part 201. In addition, the related class searching part 254 retrieves the related class relating to the selected class by a user based on the identification coefficient table stored in the identification coefficient table storage part 222. The related class searching part 254 supplies the retrieved related class, and information indicating the similarity between the selected class and the related class to the display control part 204 and the class identifying part 252.

The related cluster searching part 255 acquires information indicating the descriptions of the user instruction from the user instruction acquiring part 201. In addition, the related cluster searching part 255 acquires information indicating the keywords of the individual contents and the score of each of the keywords from the keyword extracting part 202. Moreover, as described later with reference to FIGS. 5 to 7, the related cluster searching part 255 retrieves a cluster (hereinafter, referred to as a related cluster) relating to the cluster selected by a user (hereinafter, referred to as a selected cluster). The related class searching part 254 supplies information indicating the retrieved related cluster and the relevance ratio between the selected cluster and the related cluster to the display control part 204.

The cluster identifying part 256 acquires information indicating the descriptions of the user instruction from the user instruction acquiring part 201. In addition, the cluster identifying part 256 acquires information indicating the keywords of the individual contents and the score of each of the keywords from the keyword extracting part 202. Moreover, as described later with reference to FIGS. 5 to 7, the cluster identifying part 256 retrieves the contents relating to the selected cluster selected by a user. The cluster identifying part 256 supplies information indicating the contents relating to the selected cluster and the relevance ratio of the contents to the selected cluster to the display control part 204.

The class registering part 257 acquires information indicating the descriptions of the user instruction from the user instruction acquiring part 201. In addition, the class registering part 257 acquires information indicating the keywords of the individual contents and the score of each of the keywords from the keyword extracting part 202. Moreover, as described later with reference to FIGS. 5 to 7, the class registering part 257 registers the selected cluster selected by a user as a new set class in the identification coefficient table stored in the identification coefficient table storage part 222.

First, a content search process done by the information processing apparatus 100 will be described with reference to flow charts shown in FIGS. 5 to 7. In addition, for example, the process is started at the time when a user uses the remote controller 136 to select a base content that is the base point for a search as well as instructs a search for the contents relating to the base content, and the instruction is supplied to the user instruction acquiring part 201 through the U/I control part 105. In addition, for example, a user selects a content for an operation target as the base content in such ways that the user selects a broadcast program currently seen or a recorded broadcast program now being reproduced as the base content, the user selects a desired content as the base content among the contents shown in the EPG, the content list in the RSS format and the title list of the contents, or the user selects an item "see the related contents" from an operating menu for the contents to be operation targets to be reproduced, deleted and so on.

In addition, a user uses the remote controller 136 to specify an area for which the contents are searched (hereinafter, referred to as a search area), as necessary. In addition, hereinafter, an example will be described in which a search area is the contents whose broadcast program information is stored in the broadcast program information storage part 221.

In Step S1, the content searching part 251 searches for the contents relating to the base content. In other words, the user instruction acquiring part 201 instructs the content searching part 251, the class identifying part 252, and the clustering part 253 to search for the contents relating to the base content selected by a user.

The keyword extracting part 202 reads broadcast program information about the individual contents out of the broadcast program information storage part 221. The keyword extracting part 202 subjects each item of broadcast program information to morphological analysis to extract keywords relating to each of the contents. In addition, the keyword extracting part 202 sets the score for each of the keywords in the individual contents based on the frequency of appearance and the position of appearance of the keyword in broadcast program information and the attribute of the keyword. For example, suppose it is based on the frequency of appearance of a keyword, in the case in which the same keyword appears three times in a single item of broadcast program information, the keyword is given a score triple the score given every time when the keyword appears for one time. In addition, for example, suppose it is based on the position of appearance of the keyword, a keyword that appears in the title of a broadcast program is given a higher score than a keyword that appears in the outline of a broadcast program. Moreover, for example, suppose it is based on the attribute of a keyword, keywords of proper nouns and names are given a higher score than keywords of common nouns and verbs.

The keyword extracting part 202 supplies information indicating the keywords of the individual contents and the score set to each of the keywords to the content searching part 251, the class identifying part 252, and the clustering part 253.

The content searching part 251 computes the goodness of fit between the individual contents and the base content. For example, in the case in which the goodness of fit between a content A and a base content B, the goodness of fit is computed by Equation (1) below, where keywords common to the content A and the base content B are a keyword C and a keyword D, the score of the keyword C in the content A is Sca, the score of the keyword D is Sda, the score of the keyword C in the base content B is Scb, and the score of the keyword D is Sdb.

$$\text{goodness of fit} = Sca \times Scb + Sda \times Sdb \quad (1)$$

In other words, the goodness of fit is a value that keywords common to two contents are extracted and the scores of the extracted keyword in the two contents are multiplied and then added. Therefore, the larger the number of keywords common to each other is and the greater the scores of the keywords common to each other are, that is, the closer the characteristics of two contents are, the higher the goodness of fit is.

The content searching part 251 extracts the contents whose goodness of fit to the base content is a predetermined threshold or greater as the contents relating to the base content. The content searching part 251 instructs the class identifying part 252 to identify the extracted contents, that is, to identify the set class to which the contents relating to the base content belong.

In addition, the scheme of searching for the contents relating to the base content is not restricted to the example described above. The other schemes may be used.

In Step S2, the class identifying part 252 identifies the set class to which the retrieved contents belong. In other words, first, the class identifying part 252 computes the relevance ratio of the contents relating to the base content to each of the set classes. For example, in the case of computing the relevance ratio of the content A relating to the base content to a set class B, the relevance ratio of the content A to the set class B is computed by Equation (2) below, where among the keywords of the content A, keywords matched with identifier words defined in the identification coefficient table are a keyword C and a keyword D, the score of the keyword C in the content A is Sc, the score of the keyword D is Sd, the identification coefficient of the keyword C in the set class B is Dc, and the identification coefficient of the keyword D is Dd.

$$\text{relevance ratio} = Sc \times Dc + Sd \times Dd \quad (2)$$

In other words, the relevance ratio is a value that among the keywords of the contents to be the targets for computing the relevance ratio, keywords matched with identifier words are extracted, the score of the extracted keyword is multiplied by the identification coefficient in the set class to be a target for computing the relevance ratio to obtain a value, and the values are added to each other. Therefore, as the number of keywords matched with identifier words is larger and the score and identification coefficient of the keyword are greater, the relevance ratio becomes higher.

In addition, in Equation (2), instead of the score of the keyword, the frequency of appearance of the keyword in broadcast program information may be used.

The class identifying part 252 determines that the set class whose relevance ratio is a predetermined threshold or greater is the set class to which the contents belong. In addition, in the case in which there is a plurality of set classes whose relevance ratio is a threshold or greater to a single content, it may be determined that the content belongs to all the set classes, or it may be determined that the content belongs only to the set class whose relevance ratio is the maximum.

In addition, if there is no set class whose relevance ratio is a predetermined threshold or greater, it is determined that no set class is identified for the content, that is, it is the content that does not belong to any set classes.

The class identifying part 252 supplies information indicating the identified result to the display control part 204. In addition, the class identifying part 252 instructs the clustering part 253 to cluster a set of the contents whose belonging class is not identified. Moreover, the class identifying part 252 computes the relevance ratio of the base content to each of the set classes, and supplies information indicating the computed relevance ratio to the display control part 204.

In Step S3, the clustering part 253 clusters a set of the contents whose belonging class is not identified. In other words, for the individual contents whose belonging set class is not identified, the clustering part 253 generates content keyword information having a vector type data structure in which elements are the keywords of the individual contents and a weight is a value based on the score of each of the keywords. The clustering part 253 computes the similarity between the individual contents, based on the Euclidean distance or cosine measure between items of content keyword information. The clustering part 253 classifies a set of the contents whose belonging class is not identified into clusters based on the computed similarity. In addition, the clustering part 253 extracts the keyword expressing the characteristics of the individual clusters, and sets them to the cluster names of the individual clusters. The clustering part 253 supplies information indicating the contents belonging to the individual clusters and the cluster names of the individual clusters to the display control part 204.

In addition, the scheme used for the clustering process is not restricted to particular schemes. Desirably, a suitable scheme is adopted depending on the types of contents.

Figure 8:
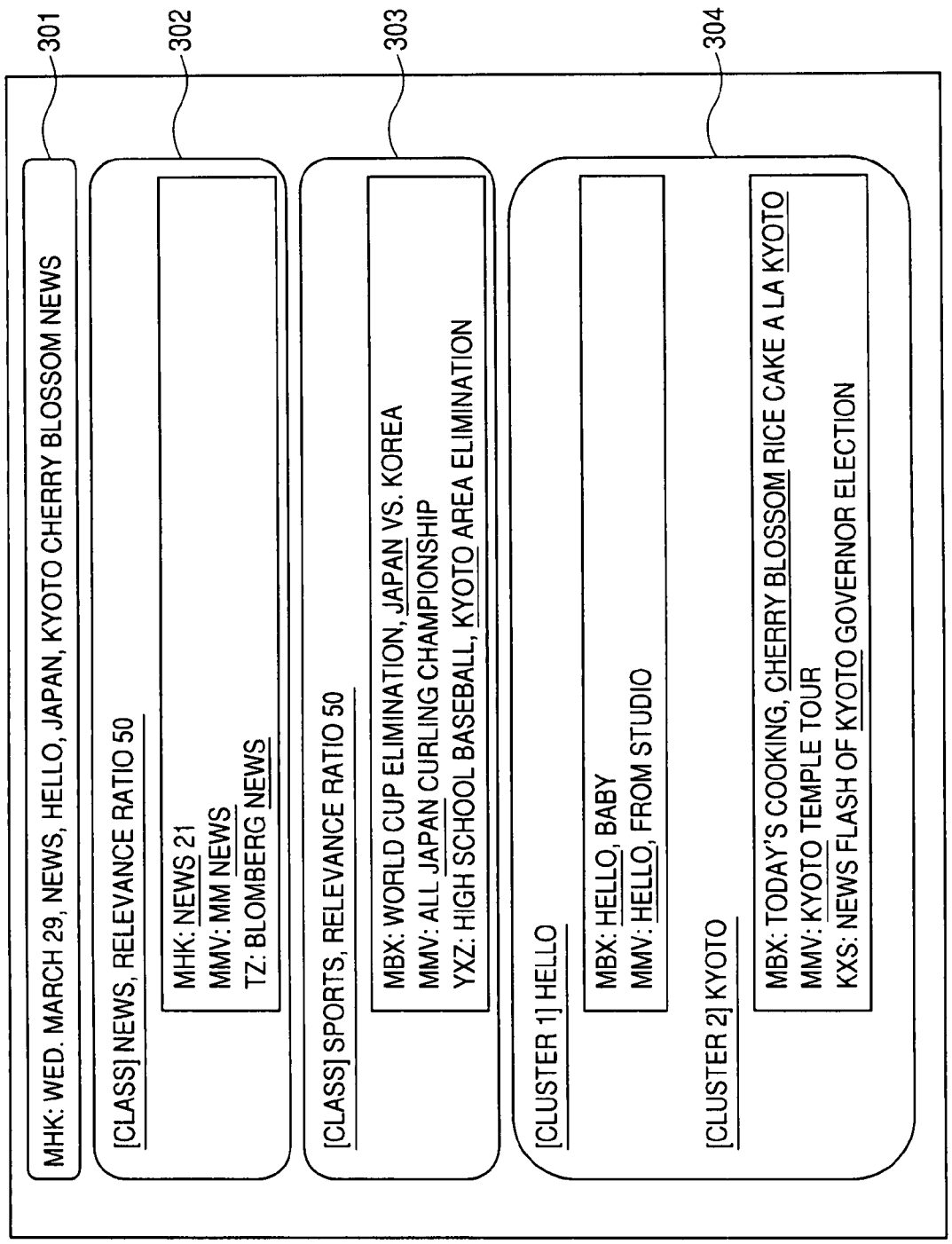
FIG. 8 shows a diagram depicting an exemplary display screen of the search result of contents.

In Step S4, the display control part 204 displays the search result. In other words, the display control part 204 reads the base content, and broadcast program information about the contents relating to the base content out of the broadcast program information storage part 221. For example, the display control part 204 controls the display controller 112 to display the screen showing the search result as shown in FIG. 8 on the display 114 based on broadcast program information about the acquired individual contents and information about the set class or the cluster to which the individual contents belong. In an exemplary screen shown in FIG. 8, four windows 301 to 304 are vertically arranged and displayed.

The window 301 displays information about the base content selected by a user, for example, the broadcast station, the broadcast date and time, the genre to which the base content belongs, the title, and the outline.

The windows 302 and 303 display the contents whose belonging set class is identified as the contents are classified to every set class among the contents relating to the base content. In other words, in each of the windows 302 and 303, the set class name and the relevance ratio of the base content to the set class are displayed. In addition, in each of the windows 302 and 303, among the contents relating to the base content which belong to the set class, the list of the broadcast station, title, outline and others of at least a part of the contents is displayed. In addition, in the windows 302 and 303, the relevance ratios between the corresponding set class and the base content are arranged and displayed from above in descending order.

In the window 304, among the contents relating to the base content, the contents whose belonging set class is not identified are classified into every cluster and displayed. In other words, in the window 304, the list of the cluster names of the individual clusters, and the broadcast station, title, outline and others of at least a part of the contents is displayed among the contents relating to the base content which are determined that they belong to the cluster.

In addition, in the list of the individual contents in the windows 302 to 304, an underline is displayed, or text colors, fonts, background colors and others are changed, whereby the keywords matched with the keyword of the base content are conspicuously displayed. In addition, FIG. 8 shows an example in which the keywords matched with the keyword of the base content are underlined and displayed.

As described above, the contents relating to the base content are classified into each of the set classes and the clusters to which the individual contents belong, and represented to a user. Therefore, the contents classified into each of the set classes as well as the contents having a little relation to the existing set class can be retrieved easily. In other words, desired contents can be retrieved easily.

In addition, in the case in which the number of types of the set classes or the clusters to which the contents relating to the base content belong is large and the display of the set classes or the clusters is not contained in a single screen, for example, the display is split into a plurality of screens, or the screen is scrolled, whereby information about all the set classes and the clusters is displayed.

In Step S5, the user instruction acquiring part 201 determines whether it is instructed that the display of the search result is finished. If it is determined that finishing the display of the search result is not instructed, the process goes to Step S6.

In Step S6, the user instruction acquiring part 201 determines whether a set class is selected. If it is determined that a set class is not selected, the process goes to Step S7.

In Step S7, the user instruction acquiring part 201 determines whether a cluster is selected. If it is determined that a cluster is not selected, the process returns to Step S5.

After that, the processes from Step S5 to S7 are repeatedly performed, until it is determined that finishing the display of the search result is instructed in Step S5, or it is determined that a set class is selected in Step S6, or it is determined that a cluster is selected in Step S7.

In Step S5, for example, in the case in which a user uses the remote controller 136 to enter the instruction of finishing the display of the search result through the U/I control part 105 and the instruction is supplied to the user instruction acquiring part 201, the user instruction acquiring part 201 determines that finishing the display of the search result is instructed, and the content search process is ended.

Figure 9:
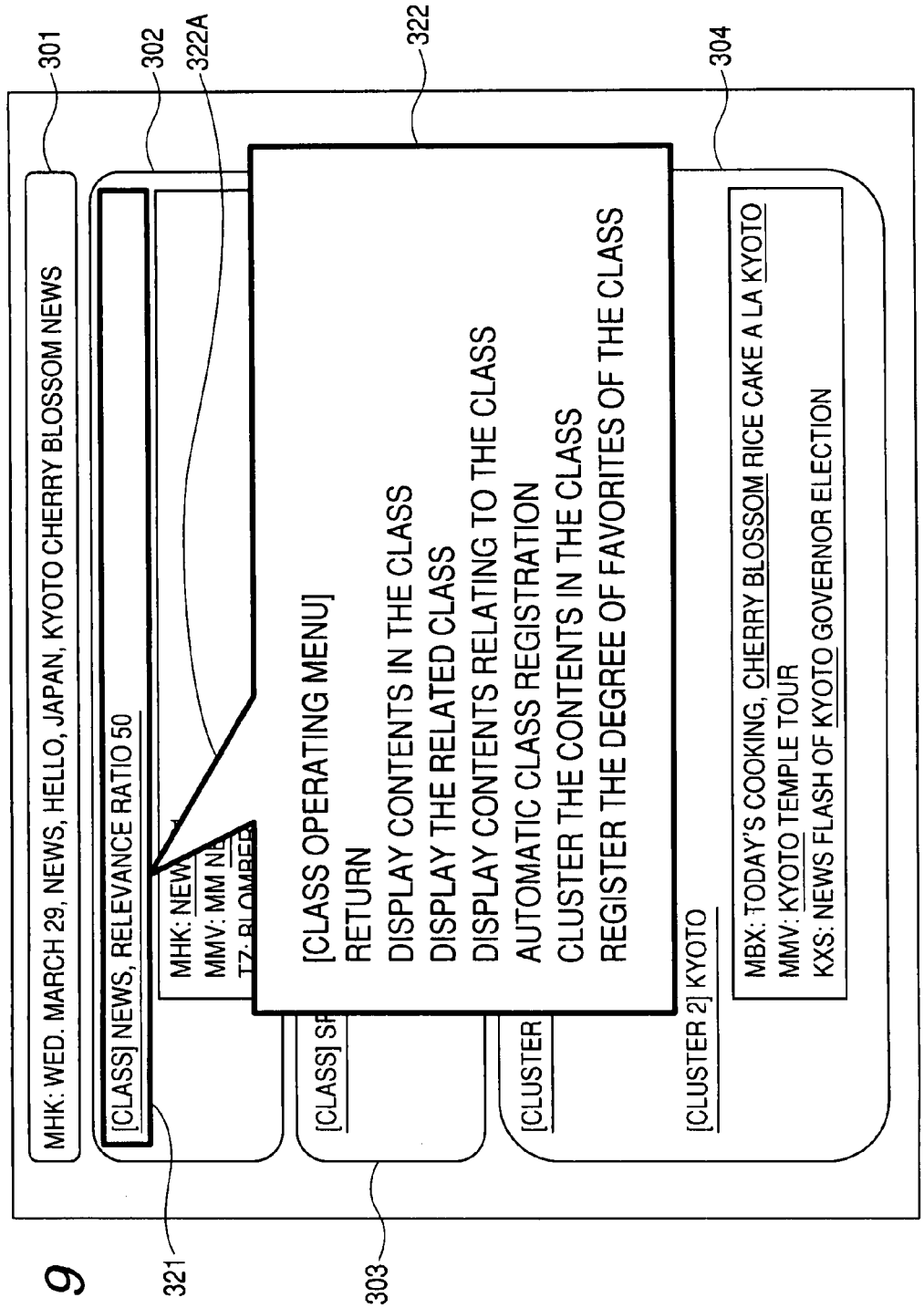
FIG. 9 shows a diagram depicting an exemplary class operating menu.

In Step S6, for example, in the case in which a user uses the remote controller 136 to move a cursor 321 so as to select one of the set classes displayed on the search result display screen as shown in FIG. 9 and the instruction by that manipulation is supplied to the user instruction acquiring part 201 through the U/I control part 105, the user instruction acquiring part 201 determines that a set class is selected, and the process goes to Step S8.

In Step S8, the display control part 204 displays the class operating menu. In other words, the user instruction acquiring part 201 instructs the display control part 204 to display the class operating menu. For example, as shown in FIG. 9, the display control part 204 controls the display controller 112 to display a new window 322 on the search result display screen shown in FIG. 8.

In the window 322, a class operating menu is displayed that includes seven selection items: "return", "display contents in the class", "display the related class", "display the contents relating to the class", "automatic class registration", "cluster contents in the class", and "register the degree of favorites of the class". In addition, a balloon 322A on the window 322 is displayed to point the cursor 321 so as to tell that the class operating menu is a menu for the set class selected by the cursor 321.

In Step S9, the user instruction acquiring part 201 determines whether "return" is selected. If it is determined that "return" is not selected, the process goes to Step S10.

In Step S10, the user instruction acquiring part 201 determines whether "display the contents in the class" is selected. If it is determined that "display the contents in the class" is not selected, the process goes to Step S11.

In Step S11, the user instruction acquiring part 201 determines whether "display the related class" is selected. If it is determined that "display the related class" is not selected, the process goes to Step S12.

In Step S12, the user instruction acquiring part 201 determines whether "display the contents relating to the class" is selected. If it is determined that "display the contents relating to the class" is not selected, the process goes to Step S13.

In Step S13, the user instruction acquiring part 201 determines whether "automatic class registration" is selected. If it is determined that "automatic class registration" is not selected, the process goes to Step S14.

In Step S14, the user instruction acquiring part 201 determines whether "cluster contents in the class" is selected. If it is determined that "cluster contents in the class" is not selected, the process goes to Step S15.

In Step S15, the user instruction acquiring part 201 determines whether "register the degree of favorites of the class" is selected. If it is determined that "register the degree of favorites of the class" is not selected, the process goes to Step S16.

In Step S16, the user instruction acquiring part 201 determines whether the selected set class is changed. If it is determined that the selected set class is not changed, the process goes to Step S17.

In Step S17, the user instruction acquiring part 201 determines whether an item other than the set class and the cluster is selected. If it is determined that an item other than the set class and the cluster is not selected, the process goes to Step S18.

In Step S18, the user instruction acquiring part 201 determines whether a cluster is selected. If it is determined that a cluster is not selected, the process returns to Step S9, and the process steps after Step S9 are performed.

In Step S9, for example, in the case in which a user uses the remote controller 136 to select "return" from the class operating menu and the instruction by that manipulation is supplied to the user instruction acquiring part 201 through the U/I control part 105, the user instruction acquiring part 201 determines that "return" is selected, and the process goes to Step S19.

In Step S19, the display control part 204 deletes the class operating menu. In other words, the user instruction acquiring part 201 instructs the display control part 204 to delete the class operating menu. The display control part 204 controls the display controller 112 to delete the window 222. After that, the process returns to Step S5, and the process steps after Step S5 are performed.

In Step S10, for example, in the case in which a user uses the remote controller 136 to select "display contents in the class" from the class operating menu and the instruction by that manipulation is supplied to the user instruction acquiring part 201 through the U/I control part 105, the user instruction acquiring part 201 determines that "display contents in the class" is selected, and the process goes to Step S20.

In Step S20, the display control part 204 displays all the contents belonging to the selected class, and the content search process is ended. In other words, the user instruction acquiring part 201 sends a notice to the display control part 204 that "display contents in the class" is selected. The display control part 204 controls the display controller 112 to display all the contents belonging to the selected class on the display 114.

Figure 10:
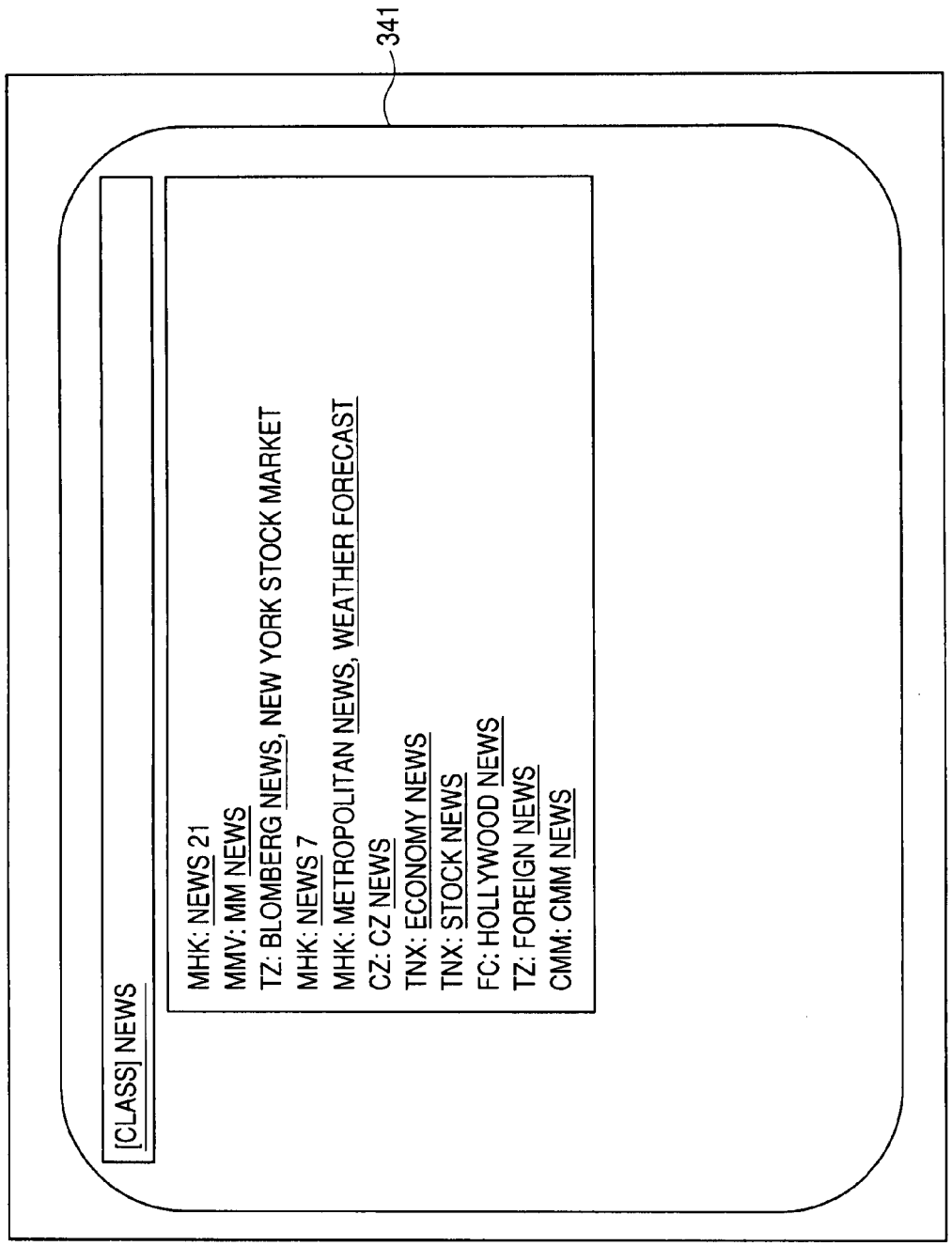
FIG. 10 shows a diagram depicting an exemplary screen in the case in which all the contents belonging to the selected class are displayed.

FIG. 10 shows an exemplary screen in the case in which all the contents belonging to the selected class are displayed. In the exemplary screen shown in FIG. 10, the class name of the selected class is displayed as well as the list of the broadcast station, title, outline and others of all the contents belonging to the selected class among the contents relating to the base content is displayed in the window 341. In addition, in the case in which the number of contents is large and the display of the contents is not contained in a single screen, the display is split into a plurality of screens, or the screen is scrolled, whereby information about all the contents belonging to the selected class is displayed.

In addition, in the list of the individual contents in the window 341, an underline is displayed or text colors, fonts, background colors and others are changed, whereby the identifier word having a higher identification coefficient in the selected class is conspicuously displayed. In addition, FIG. 10 shows an example in which the identifier word having a higher identification coefficient is underlined.

As described above, a user can easily confirm information about all the contents belonging to the selected class.

In Step S11, for example, in the case in which a user uses the remote controller 136 to select "display the related class" from the class operating menu and the instruction by that manipulation is supplied to the user instruction acquiring part 201 through the U/I control part 105, in Step S11, the user instruction acquiring part 201 determines that "display the related class" is selected, and the process goes to Step S21.

In Step S21, the display control part 204 displays the related class, and the content search process is ended. In other words, the user instruction acquiring part 201 sends a notice to the display control part 204, the class identifying part 252, and the related class searching part 254 that "display the related class" is selected.

The related class searching part 254 reads the identification coefficient table out of the identification coefficient table storage part 222. The related class searching part 254 determines a cosine measure of the identification coefficient between two set classes as the similarity between the selected class and another set class. For example, as shown in FIG. 11, in the case in which a user selects a set class "news", a cosine measure of the identification coefficient is determined between the individual set classes "news" and "economy", "news" and "stocks", and "news" and "entertainment variety" as the similarity between the individual set classes. The related class searching part 254 extracts the set class having the determined similarity higher than a predetermined threshold as the related class relating to the selected class. The related class searching part 254 supplies information indicating the extracted related class and the similarity between the selected class and the related class to the display control part 204 and the class identifying part 252.

As similar to the process in Step S2 described above, the class identifying part 252 computes the relevance ratio of the individual contents to the related class, and extracts the contents having a relevance ratio higher than a predetermined threshold as the contents belonging to the related class. The class identifying part 252 supplies information indicating the contents belonging to the individual related classes to the display control part 204.

Figure 12:
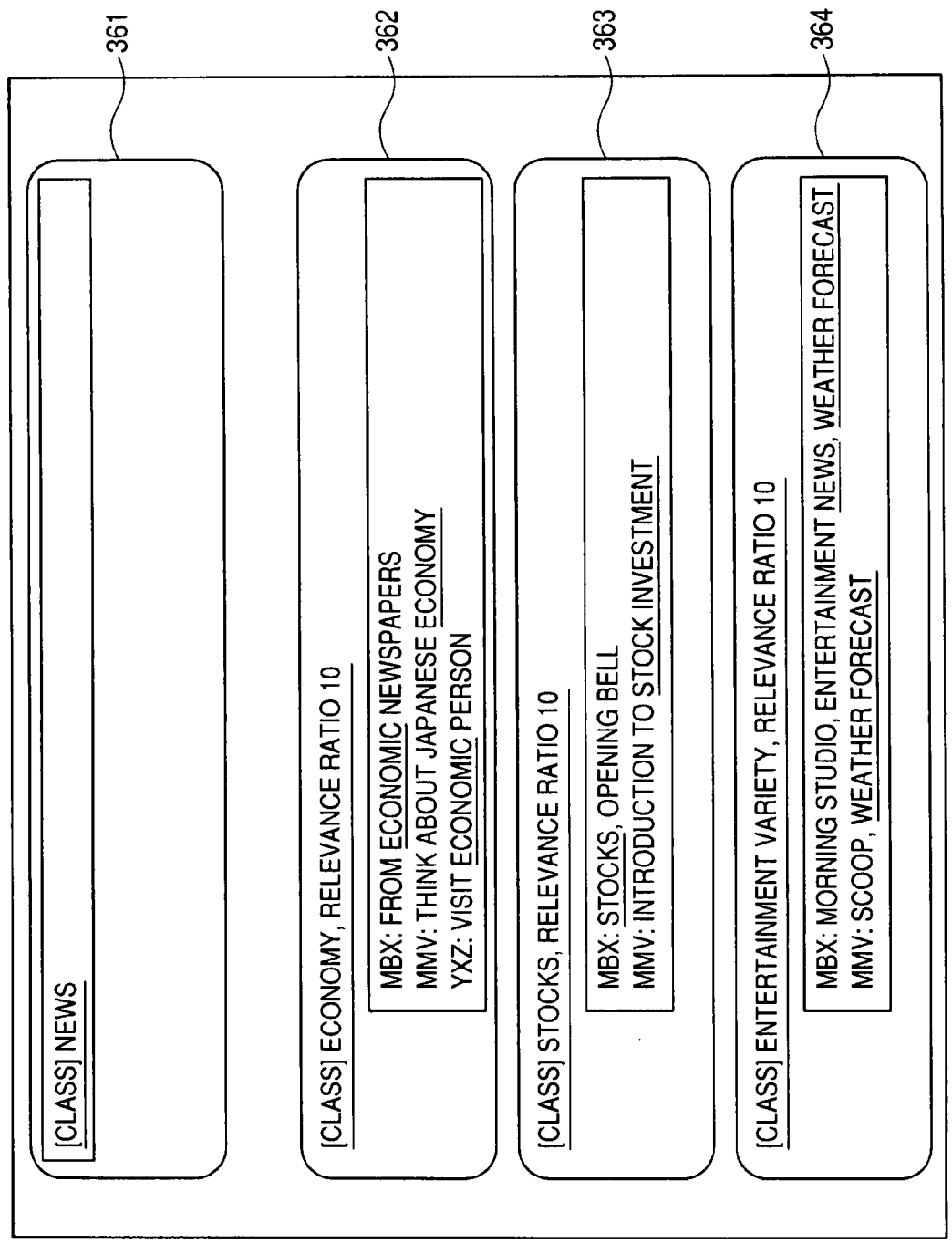
FIG. 12 shows a diagram depicting an exemplary display screen of the search result of related classes.

The display control part 204 controls the display controller 112 to display the search result of the related classes on the display 114. FIG. 12 shows an exemplary display screen of the search result of the related classes. In the exemplary screen shown in FIG. 12, windows 361 to 364 are displayed in the screen. In the window 361, the class name of the selected class is displayed. In the windows 362 to 364, the list of the class name of the related class, the relevance ratio that is a value based on the similarity between the selected class and the related class, and the broadcast station, title, outline and others of at least a part of the contents among the contents belonging to the related class is displayed. In addition, in the windows 362 to 364, the relevance ratios of the corresponding related classes to the set class are arranged and displayed from above in descending order.

In addition, in the list of the individual contents in each of the windows 362 to 364, an underline is displayed or text colors, fonts, background colors and others are changed, whereby the identifier word having a higher identification coefficient in each of the related classes is conspicuously displayed. In addition, FIG. 12 shows an example in which the identifier word having a higher identification coefficient is underlined.

In addition, in the case in which the number of related classes is large and the related classes are not contained in a single screen, for example, the display is split into a plurality of screens, or the screen is scrolled, whereby information about all the related classes is displayed.

As described above, a user can easily retrieve the related class relating to the selected class and the contents belonging to the related class.

In Step S12, for example, in the case in which a user uses the remote controller 136 to select "display the contents relating to the class" from the class operating menu and the instruction by that manipulation is supplied to the user instruction acquiring part 201 through the U/I control part 105, the user instruction acquiring part 201 determines that "display the contents relating to the class" is selected, and the process goes to Step S22.

In Step S22, the display control part 204 displays the contents relating to the selected class, and the content search process is ended. In other words, the user instruction acquiring part 201 sends a notice to the display control part 204 and the class identifying part 252 that "display the contents relating to the class" is selected by a user.

By the process similar to the process in Step S2 described above, the class identifying part 252 computes the relevance ratio of the contents not belonging to the selected class to the selected class, and extracts the contents having the relevance ratio higher than a predetermined threshold as the contents relating to the selected class. The class identifying part 252 supplies information indicating the contents relating to the selected class and the relevance ratio of the contents to the selected class to the display control part 204.

Figure 13:
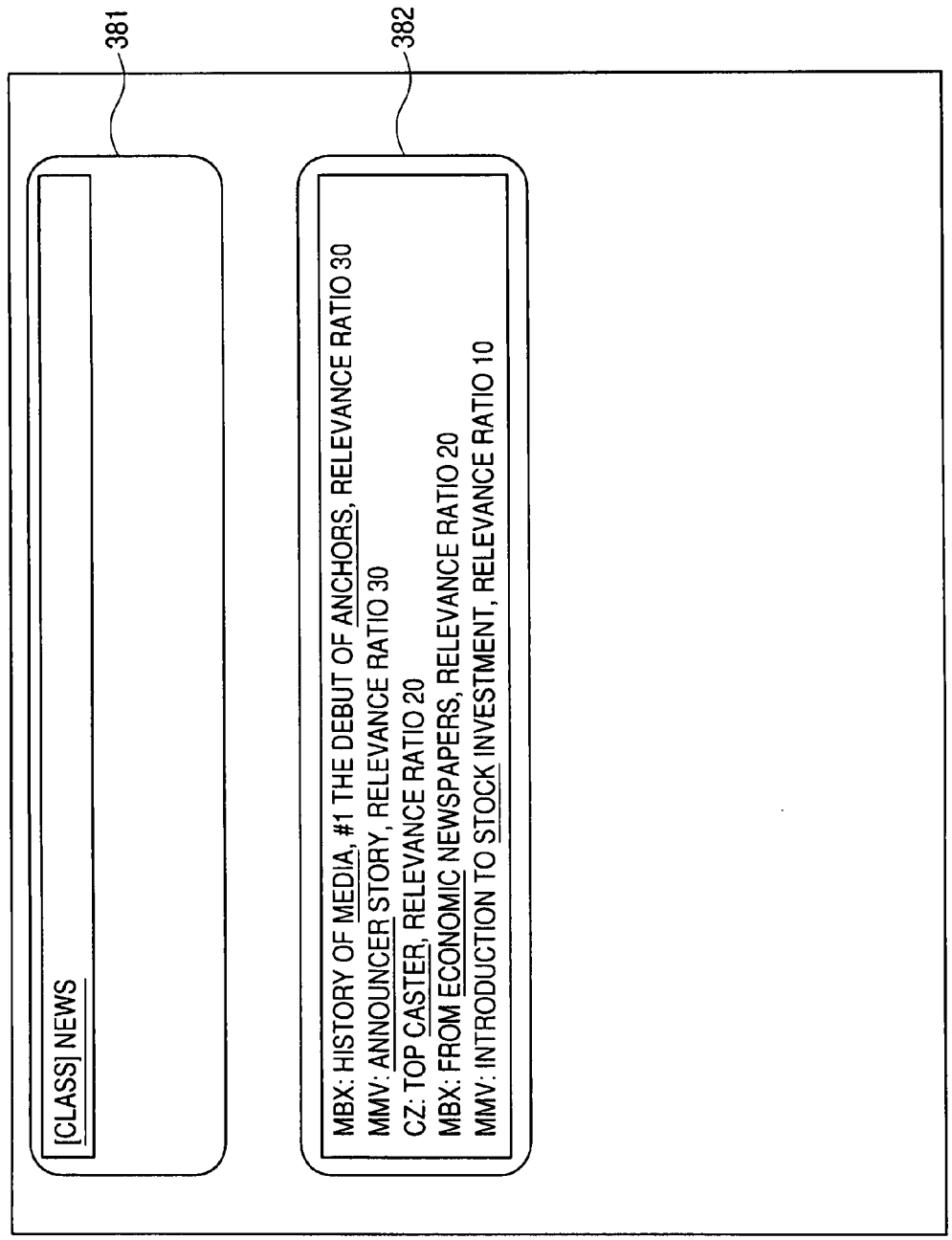
FIG. 13 shows a diagram depicting an exemplary display screen of the search result of contents relating to the selected class.

The display control part 204 acquires broadcast program information about the contents relating to the selected class from the broadcast program information storage part 221. The display control part 204 controls the display controller 112 to display the search result of contents relating to the selected class on the display 114 based on the acquired broadcast program information about the individual contents. FIG. 13 shows an exemplary display screen of the search result of contents relating to the selected class. In the exemplary screen shown in FIG. 13, windows 381 and 382 are displayed in the screen. In the window 381, the class name of the selected class is displayed. In the window 382, the list of the broadcast station, the title, the outline of at least a part of the contents among the contents relating to the selected class and the relevance ratio to the selected class is displayed. In addition, in the window 382, the individual contents are arranged displayed from above in descending order of the relevance ratio to the selected class.

In addition, in the list of the individual contents in the window 382, an underline is displayed or text colors, fonts, background colors and others are changed, whereby the identifier word having a higher identification coefficient in the selected class is conspicuously displayed. Moreover, FIG. 13 shows an example in which the identifier word having a higher identification coefficient is underlined.

In addition, in the case in which the number of the contents relating to the selected class is large and the display of the contents is not contained in a single screen, the display is split into a plurality of screens, or the screen is scrolled, whereby information about all the contents relating to the selected class is displayed.

As described above, a user can easily retrieve the contents relating to the selected class.

In Step S13, for example, in the case in which a user uses the remote controller 136 to select "automatic class registration" from the class operating menu and the instruction by that manipulation is supplied to the user instruction acquiring part 201 through the U/I control part 105, the user instruction acquiring part 201 determines that "automatic class registration" is selected, and the process goes to Step S23.

In Step S23, the taste information registering part 205 automatically registers the selected class, and the content search process is ended. In other words, the user instruction acquiring part 201 sends a notice to the taste information registering part 205 that "automatic class registration" is selected by a user. The taste information registering part 205 reads the identification coefficient table out of the identification coefficient table storage part 222.

For example, among the keywords registered in the taste information stored in the taste information storage part 223, the taste information registering part 205 adds the identification coefficient of the matched identifier word in the selected class to the degree of tastes of the keyword matched with the identifier word registered in the identification coefficient table. Therefore, the degree of tastes of the keyword having a positive value of the identification coefficient in the selected class is set higher, whereas the degree of tastes of the keyword having a negative value of the identification coefficient in the selected class is set lower.

In addition, for example, the taste information registering part 205 adds the degree of tastes of the selected class, among the degree of tastes of each of the set classes registered in the taste information stored in the taste information storage part 223.

In Step S14, for example, in the case in which a user uses the remote controller 136 selects "cluster the contents in the class" from the class operating menu and the instruction by that manipulation is supplied to the user instruction acquiring part 201 through the U/I control part 105, the user instruction acquiring part 201 determines that "cluster the contents in the class" is selected, and the process goes to Step S24.

In Step S24, the clustering part 253 clusters the contents belonging to the selected class, and the content search process is ended. In other words, the user instruction acquiring part 201 sends a notice to the display control part 204 and the clustering part 253 that "cluster the contents in the class" is selected. As similar to the process in Step S3 described above, the clustering part 253 clusters a set of the contents belonging to the selected class. In addition, the clustering part 253 extracts the keyword expressing the characteristics of the individual clusters, and sets it to the cluster names of the individual clusters. The clustering part 253 supplies information indicating the contents belonging to the individual clusters and the cluster names of the individual clusters to the display control part 204.

Figure 14:
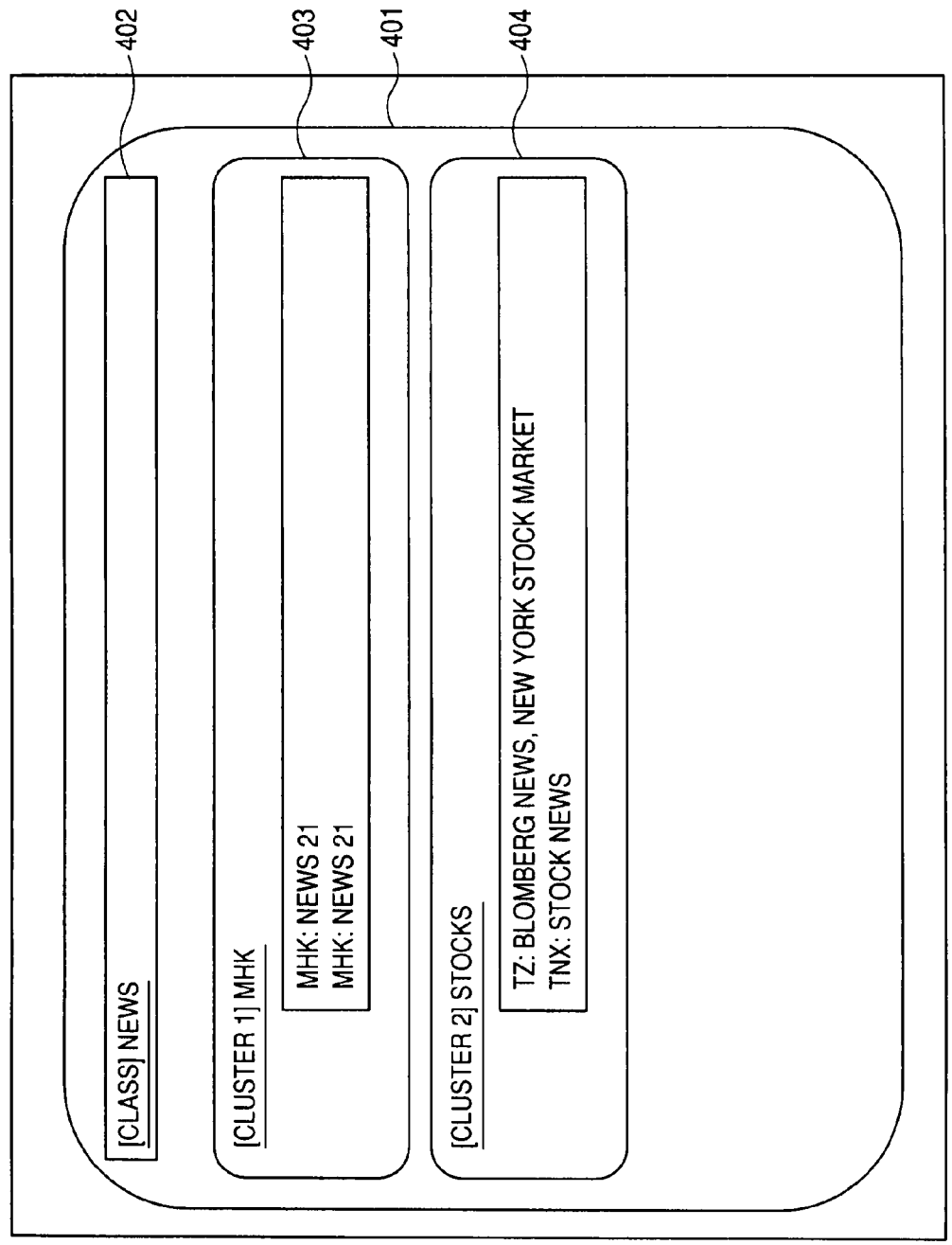
FIG. 14 shows a diagram depicting an exemplary display screen of the result of the clustering process for the selected class.

The display control part 204 controls the display controller 112 to display the result of the clustering process on the display 114. FIG. 14 shows an exemplary display screen of the result of the clustering process. In the exemplary screen shown in FIG. 14, a window 401 is displayed in the screen, and windows 402 to 404 are displayed in the window 401. In the window 402, the class name of the selected class is displayed. In addition, in the windows 403 and 404, the individual contents belonging to the selected class are classified into every cluster and displayed. In other words, the list of the cluster names of the individual clusters, and the broadcast station, title, outline and others of at least a part of the contents among the contents belonging to the selected class and also belonging to the cluster is displayed.

In addition, in the case in which the number of clusters is large and the display of the clusters is not contained in a single screen, for example, the display is split into a plurality of screens, or the screen is scrolled, whereby information about all the clusters is displayed.

Therefore, a user can more easily retrieve desired contents among the contents belonging to the selected class.

In Step S15, for example, in the case in which a user uses the remote controller 136 to select "register the degree of favorites of the class" from the class operating menu and the instruction by that manipulation is supplied to the user instruction acquiring part 201 through the U/I control part 105, the user instruction acquiring part 201 determines that "register the degree of favorites of the class" is selected, and the process goes to Step S25.

In Step S25, the taste information registering part 205 registers the degree of favorites of the selected class, and the content search process is ended. In other words, the user instruction acquiring part 201 sends a notice to the taste information registering part 205 that "register the degree of favorites of the class" is selected. For example, the taste information registering part 205 receives information indicating the degree of favorites to the selected class that is inputted into the remote controller 136 by a user through the U/I control part 105 and the user instruction acquiring part 201. For example, the value of the degree of favorites is in seven stages from −3 to +3. The taste information registering part 205 reads the identification coefficient table out of the identification coefficient table storage part 222.

For example, among the keywords registered in the taste information stored in the taste information storage part 223, the taste information registering part 205 adds the value that the identification coefficient of the matched identifier word in the selected class is multiplied by the degree of favorites to the degree of tastes of the keyword matched with the identifier word registered in the identification coefficient table. Therefore, in the case in which the degree of favorites is set to a positive value, the degree of tastes of the keyword having a positive value of the identification coefficient in the selected class is set higher, whereas the degree of tastes of the keyword having a negative value of the identification coefficient is set lower. In addition, in the case in which the degree of favorites is set to a negative value, the degree of tastes of the keyword having a positive value of the identification coefficient in the selected class is set lower, whereas the degree of tastes of the keyword having a negative value of the identification coefficient is set higher.

In addition, for example, among the degree of tastes of each of the set classes registered in the taste information stored in the taste information storage part 223, the taste information registering part 205 adds the degree of favorites inputted by a user to the degree of tastes of the selected class. Therefore, in the case in which the degree of favorites is set to a positive value, the degree of tastes of the selected class is set higher, whereas in the case in which the degree of favorites is set to a negative value, the degree of tastes of the selected class is set lower.

In Step S16, for example, in the case in which a user uses the remote controller 136 to move the cursor 321 so as to select another set class displayed on the search result display screen and the instruction by that manipulation is supplied to the user instruction acquiring part 201 through the U/I control part 105, the user instruction acquiring part 201 determines that the selected set class is changed, the process returns to Step S8, and the process steps after Step S8 are performed. In other words, a class operating menu for a newly selected set class is displayed.

In Step S17, for example, in the case in which a user uses the remote controller 136 to move the cursor 321 so as to select an item other than the set class displayed on the search result display screen and the cluster and the instruction by that manipulation is supplied to the user instruction acquiring part 201 through the U/I control part 105, the user instruction acquiring part 201 determines that an item other than the set class and the cluster is selected, and the process goes to Step S26.

In Step S26, as similar to the process in Step S19 described above, the class operating menu is deleted. After that, the process returns to Step S5, and the process steps after Step S5 are performed.

In Step S7 or Step S18, for example, in the case in which a user uses the remote controller 136 to move the cursor 321 so as to select one of the clusters displayed on the search result display screen and the instruction by that manipulation is supplied to the user instruction acquiring part 201 through the U/I control part 105, the user instruction acquiring part 201 determines that a cluster is selected, and the process goes to Step S27.

Figure 15:
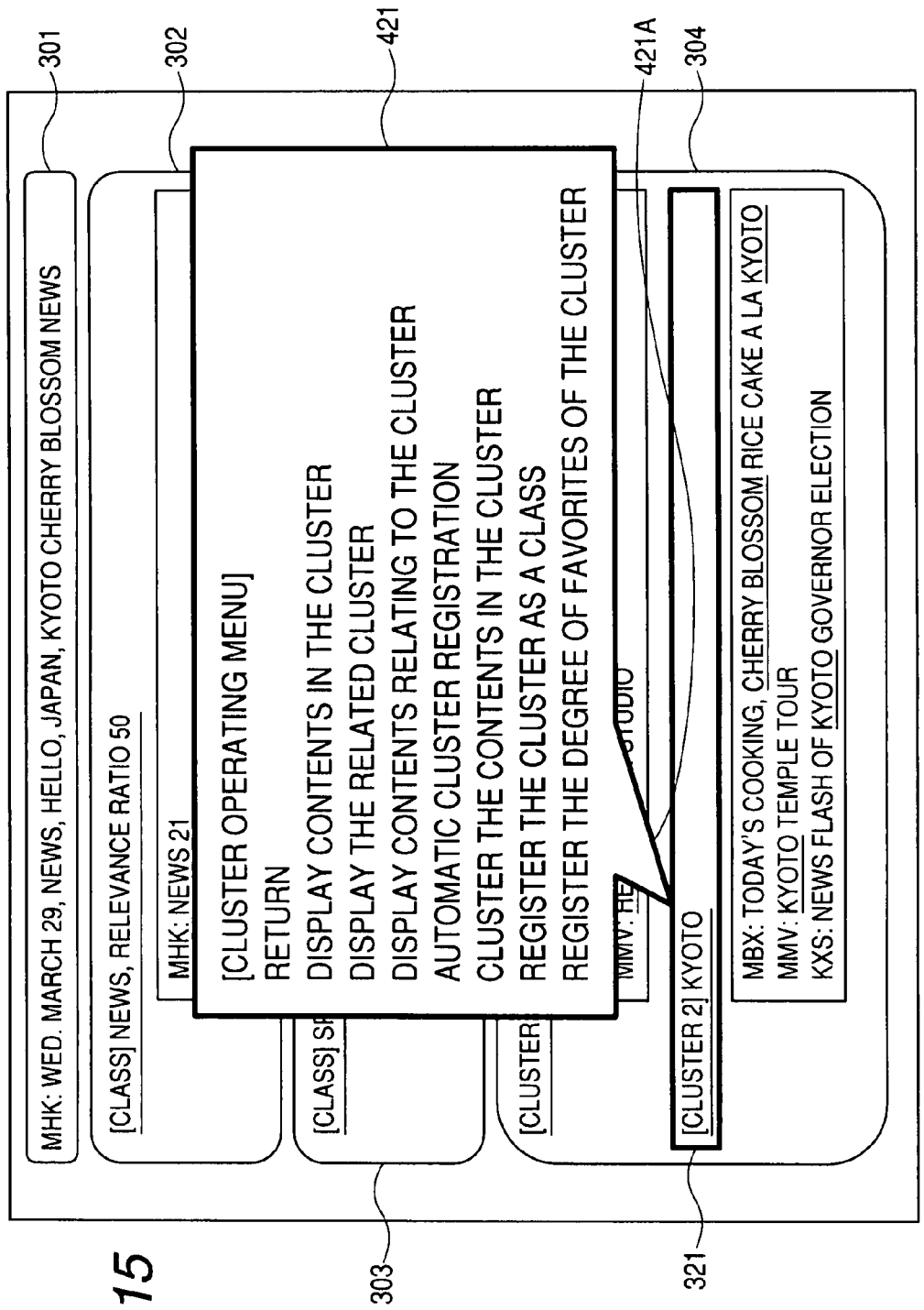
FIG. 15 shows a diagram depicting an exemplary cluster operating menu.

In Step S27, the display control part 204 displays a cluster operating menu. In other words, the user instruction acquiring part 201 instructs the display control part 204 to display the cluster operating menu. For example, as shown in FIG. 15, the display control part 204 controls the display controller 112 to display a new window 421 on the search result display screen shown in FIG. 8.

In the window 421, a cluster operating menu is displayed that includes eight selection items: "return", "display contents in the cluster", "display the related cluster", "display contents relating to the cluster", "automatic cluster registration", "cluster the contents in the cluster", "register the cluster as a class", and "register the degree of favorites of the cluster". In addition, a balloon 421A of the window 421 is displayed to point the cursor 321 so as to tell that the cluster operating menu is a menu for the cluster selected by the cursor 321.

In Step S28, the user instruction acquiring part 201 determines whether "return" is selected. If it is determined that "return" is not selected, the process goes to Step S29.

In Step S29, the user instruction acquiring part 201 determines whether "display the contents in the cluster" is selected. If it is determined that "display the contents in the cluster" is not selected, the process goes to Step S30.

In Step S30, the user instruction acquiring part 201 determines whether "display the related cluster" is selected. If it is determined that "display the related cluster" is not selected, the process goes to Step S31.

In Step S31, the user instruction acquiring part 201 determines whether "display contents relating to the cluster" is selected. If it is determined that "display contents relating to the cluster" is not selected, the process goes to Step S32.

In Step S32, the user instruction acquiring part 201 determines whether "automatic cluster registration" is selected. If it is determined that "automatic cluster registration" is not selected, the process goes to Step S33.

In Step S33, the user instruction acquiring part 201 determines whether "cluster the contents in the cluster" is selected. If it is determined that "cluster the contents in the cluster" is not selected, the process goes to Step S34.

In Step S34, the user instruction acquiring part 201 determines whether "register the cluster as a class" is selected. If it is determined that "register the cluster as a class" is not selected, the process goes to Step S35.

In Step S35, the user instruction acquiring part 201 determines whether "register the degree of favorites of the cluster" is selected. If it is determined that "register the degree of favorites of the cluster" is not selected, the process goes to Step S36.

In Step S36, the user instruction acquiring part 201 determines whether the selected cluster is changed. If it is determined that the selected cluster is not changed, the process goes to Step S37.

In Step S37, the user instruction acquiring part 201 determines whether an item other than the set class and the cluster is selected. If it is determined that an item other than the set class and the cluster is not selected, the process goes to Step S38.

In Step S38, the user instruction acquiring part 201 determines whether the set class is selected. If it is determined that a set class is not selected, the process returns to Step S28, and the process steps after Step S28 are performed.

In Step S28, for example, in the case in which a user uses the remote controller 136 to select "return" from the cluster operating menu and the instruction by that manipulation is supplied to the user instruction acquiring part 201 through the U/I control part 105, the user instruction acquiring part 201 determines that "return" is selected, and the process goes to Step S39.

In Step S39, the display control part 204 deletes the cluster operating menu. In other words, the user instruction acquiring part 201 instructs the display control part 204 to delete the cluster operating menu. The display control part 204 controls the display controller 112 to delete the window 421. After that, the process returns to Step S5, and the process steps after Step S5 are performed.

In Step S29, for example, in the case in which a user uses the remote controller 136 to select "display contents in the cluster" from the cluster operating menu and the instruction by that manipulation is supplied to the user instruction acquiring part 201 through the U/I control part 105, the user instruction acquiring part 201 determines that "display contents in the cluster" is selected, and the process goes to Step S40.

In Step S40, the display control part 204 displays all the contents belonging to the selected cluster, and the content search process is ended. In other words, the user instruction acquiring part 201 sends a notice to the display control part 204 that "display contents in the cluster" is selected. The display control part 204 controls the display controller 112 to display all the contents belonging to the selected cluster on the display 114.

Figure 16:
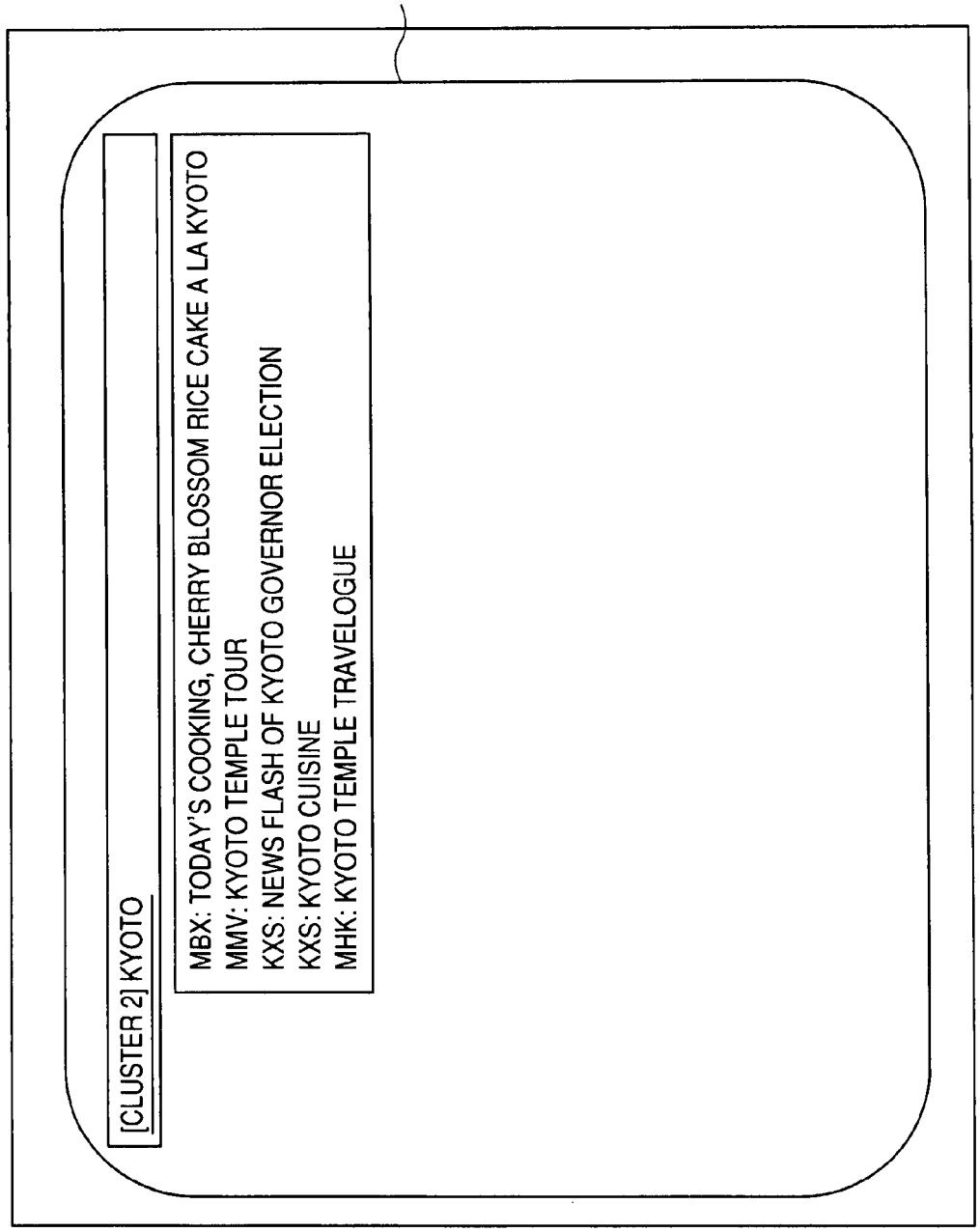
FIG. 16 shows a diagram depicting an exemplary screen in the case in which all the contents belonging to the selected cluster are displayed.

FIG. 16 shows an exemplary screen in the case in which all the contents belonging to the selected cluster are displayed. In the exemplary screen shown in FIG. 16, the cluster name of the selected cluster as well as the list of the broadcast station, title, outline and others of all the contents belonging to the selected cluster among the contents relating to the base content is displayed in a window 441. In addition, in the case in which the number of contents is large and the contents are not contained in a single screen, the display is split into a plurality of screens, or the screen is scrolled, whereby information about all the contents belonging to the selected cluster is displayed.

As described above, a user can easily confirm information about all the contents belonging to the selected cluster.

In Step S30, for example, in the case in which a user uses the remote controller 136 to select "display the related cluster" from the cluster operating menu and the instruction by that manipulation is supplied to the user instruction acquiring part 201 through the U/I control part 105, the user instruction acquiring part 201 determines that "display the related cluster" is selected, and the process goes to Step S41.

In Step S41, the display control part 204 displays the related cluster, and the content search process is ended. In other words, the user instruction acquiring part 201 sends a notice to the display control part 204 and the related cluster searching part 255 that "display the related cluster" is selected.

Among the keywords of the individual contents and the score of each of the keywords obtained in the process in Step S1, the related cluster searching part 255 acquires information indicating the keyword of the contents and the score of each of the keywords belonging to the individual clusters from the keyword extracting part 202. For the individual clusters, the related cluster searching part 255 generates cluster keyword information having a vector type data structure in which the keyword of the contents belonging to the cluster is an element and the value based on the score of each of the keywords is a weight. The related cluster searching part 255 computes the relevance ratio between the selected cluster and a cluster other than the selected cluster based on the Euclidean distance or cosine measure between items of cluster keyword information. The related cluster searching part 255 extracts the cluster having the determined relevance ratio higher than a predetermined threshold as the related cluster relating to the selected cluster. The related cluster searching part 255 supplies information indicating the extracted related cluster and the relevance ratio between the selected cluster and the related cluster to the display control part 204.

Figure 17:
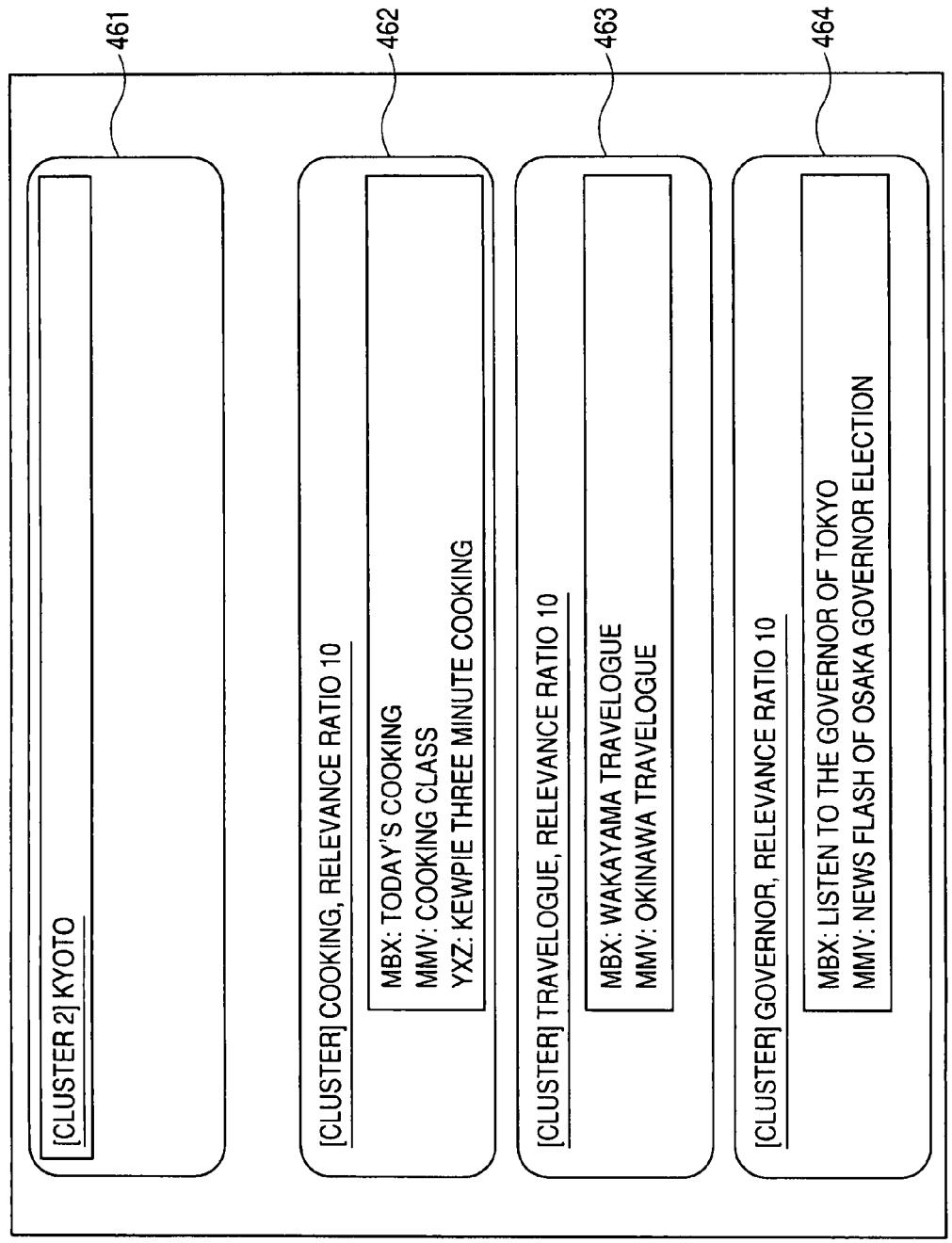
FIG. 17 shows a diagram depicting an exemplary display screen the search result of the related cluster.

The display control part 204 controls the display controller 112 to display the search result of the related cluster on the display 114. FIG. 17 shows an exemplary display screen of the search result of the related cluster. In the exemplary screen shown in FIG. 17, windows 461 to 464 are displayed in the screen. In the window 461, the cluster name of the selected cluster is displayed. In the windows 462 to 464, the list of the cluster name of the related cluster, the relevance ratio between the selected cluster and the related cluster, and the broadcast station, title, outline and others of at least a part of the contents among the contents belonging to the related cluster is displayed. In addition, the windows 462 to 464 are arranged and displayed from above in descending order of the relevance ratio between the corresponding related cluster and the selected cluster.

In addition, in the case in which the number of the related clusters is large and the display of the related clusters is not contained in a single screen, for example, the display is split into a plurality of screens, or the screen is scrolled, whereby information about all the related clusters is displayed.

As described above, a user can easily retrieve the selected cluster relating to the related cluster, and the contents belonging to the related cluster.

In Step S31, for example, in the case in which a user uses the remote controller 136 to select "display contents relating to the cluster" from the cluster operating menu and the instruction by that manipulation is supplied to the user instruction acquiring part 201 through the U/I control part 105, the user instruction acquiring part 201 determines that "display contents relating to the cluster" is selected, and the process goes to Step S42.

In Step S42, the display control part 204 displays the contents relating to the selected cluster, and the content search process is ended. In other words, the user instruction acquiring part 201 sends a notice to the display control part 204 and the cluster identifying part 256 that "display contents relating to the cluster" is selected by a user.

The cluster identifying part 256 acquires information indicating the keywords of the individual contents and the score of each of the keywords obtained in the process in Step S1 from the keyword extracting part 202. For the selected cluster, the cluster identifying part 256 generates cluster keyword information having a vector type data structure in which the keywords of the individual contents belonging to the cluster is an element and the value based on the score of each of the keywords is a weight. In addition, for the individual contents not belonging to the selected cluster, the cluster identifying part 256 generates content keyword information having a vector type data structure in which the keywords of the individual contents is an element and the value based on the score of each of the keywords is a weight.

The cluster identifying part 256 computes the relevance ratio of the individual contents to the selected cluster based on the Euclidean distance or cosine measure between content keyword information about the individual contents and cluster keyword information. The cluster identifying part 256 extracts the contents having the relevance ratio higher than a predetermined threshold as the contents relating to the selected cluster. The cluster identifying part 256 supplies the contents relating to the selected cluster, and information indicating their relevance ratios of the contents to the selected cluster to the display control part 204.

Figure 18:
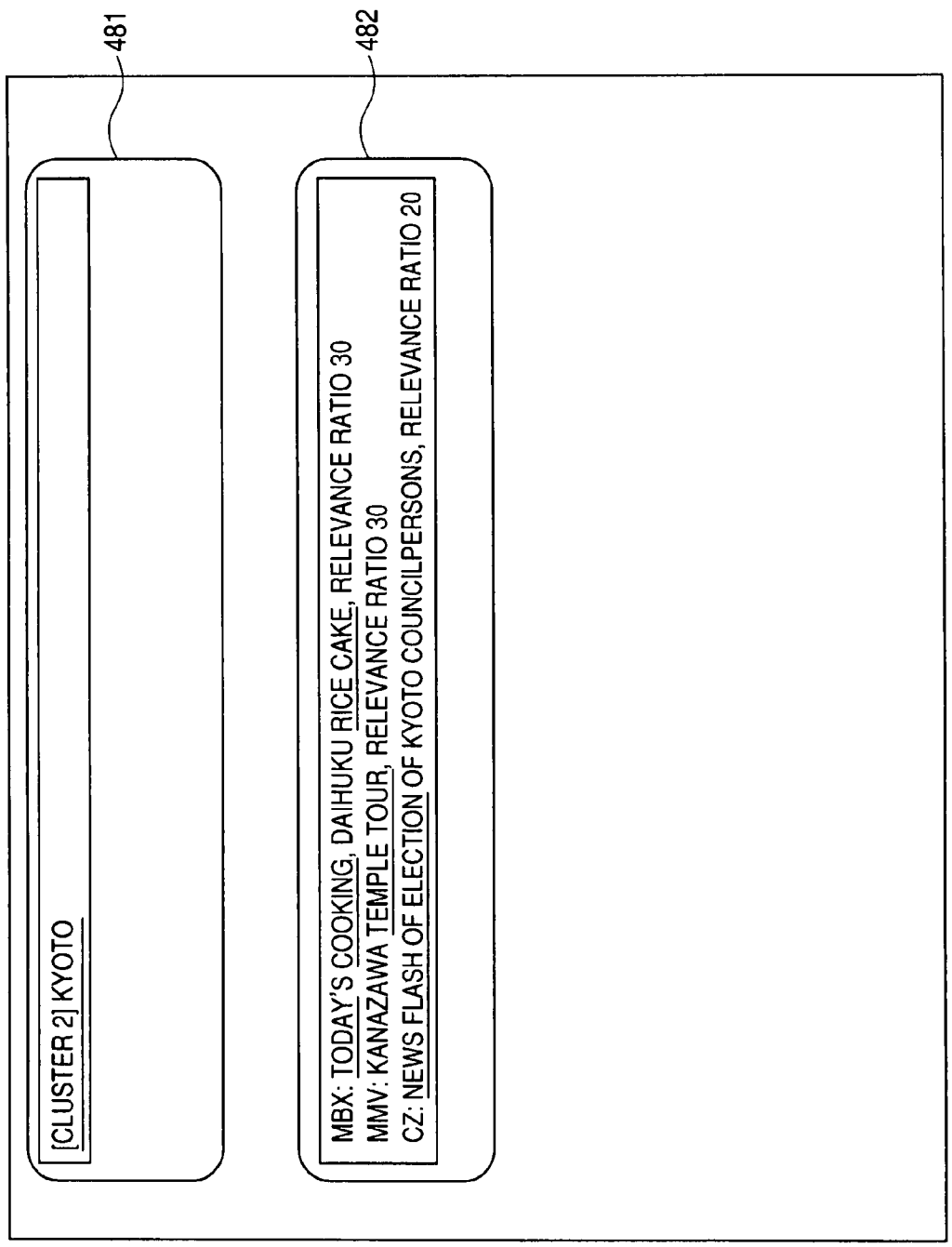
FIG. 18 shows a diagram depicting an exemplary display screen of the search result of contents relating to the selected cluster.

The display control part 204 acquires broadcast program information about the contents relating to the selected cluster from the broadcast program information storage part 221. Based on the acquired broadcast program information about the individual contents, the display control part 204 controls the display controller 112 to display the search result of contents relating to the selected cluster on the display 114. FIG. 18 shows an exemplary display screen of the search result of contents relating to the selected cluster. On the exemplary screen shown in FIG. 18, windows 481 and 482 are displayed in the screen. In addition, in broadcast program information about the contents relating to the selected cluster, the position is highlighted at which the keyword extracted from the contents belonging to the selected cluster by underlining it, for example. In the window 481, the cluster name of the selected cluster is displayed. In the window 482, the list of the broadcast station, the title, the outline, the relevance ratio to the selected cluster of at least a part of the contents among the contents relating to the selected cluster is displayed. In addition, in the window 482, the individual contents are arranged and displayed from above in descending order of the relevance ratio to the selected cluster.

In addition, in the case in which the number of the contents relating to the selected cluster is large and the display of the contents is not contained in a single screen, for example, the display is split into a plurality of screens, or the screen is scrolled, whereby information about all the contents relating to the selected cluster is displayed.

As described above, a user can easily retrieve the contents relating to the selected cluster.

In Step S32, for example, in the case in which a user uses the remote controller 136 to select "automatic cluster registration" from the cluster operating menu and the instruction by that manipulation is supplied to the user instruction acquiring part 201 through the U/I control part 105, the user instruction acquiring part 201 determines that "automatic cluster registration" is selected, and the process goes to Step S43.

In Step S43, the taste information registering part 205 automatically registers the selected cluster, and the content search process is ended. In other words, the user instruction acquiring part 201 sends a notice to the taste information registering part 205 that "automatic cluster registration" is selected by a user.

Among the keywords of the individual contents and the score of each of the keywords obtained in the process in Step S1, the taste information registering part 205 acquires information indicating the keyword of the contents belonging to the selected cluster and the score of each of the keywords from the keyword extracting part 202. Among the keywords of the contents belonging to the selected cluster, for the keyword registered in the taste information stored in the taste information storage part 223, the taste information registering part 205 adds the value based on the score and the frequency of appearance of the keyword to the degree of tastes of the keyword, whereas for the keyword not registered in the taste information, it registers the keyword to taste information as well as it sets the value based on the score and the frequency of appearance of the keyword to the degree of tastes of the keyword. Therefore, the contents belonging to the selected cluster relating to the degree of tastes of the keyword is set higher depending on the score of the keyword and the frequency of appearance.

In Step S33, for example, in the case in which a user uses the remote controller 136 to select "cluster the contents in the cluster" from the cluster operating menu and the instruction by that manipulation is supplied to the user instruction acquiring part 201 through the U/I control part 105, the user instruction acquiring part 201 determines that "cluster the contents in the cluster" is selected, and the process goes to Step S44.

In Step S44, the clustering part 253 clusters the contents belonging to the selected cluster. In other words, the user instruction acquiring part 201 sends a notice to the display control part 204 and the clustering part 253 that "cluster the contents in the cluster" is selected. As similar to the process in Step S3 described above, the clustering part 253 clusters a set of the contents belonging to the selected cluster. In addition, the clustering part 253 extracts the keyword expressing the characteristics of the individual clusters, and sets it to the cluster names of the individual clusters. The clustering part 253 supplies information indicating the contents belonging to the individual clusters and the cluster names of the individual clusters to the display control part 204.

Figure 19:
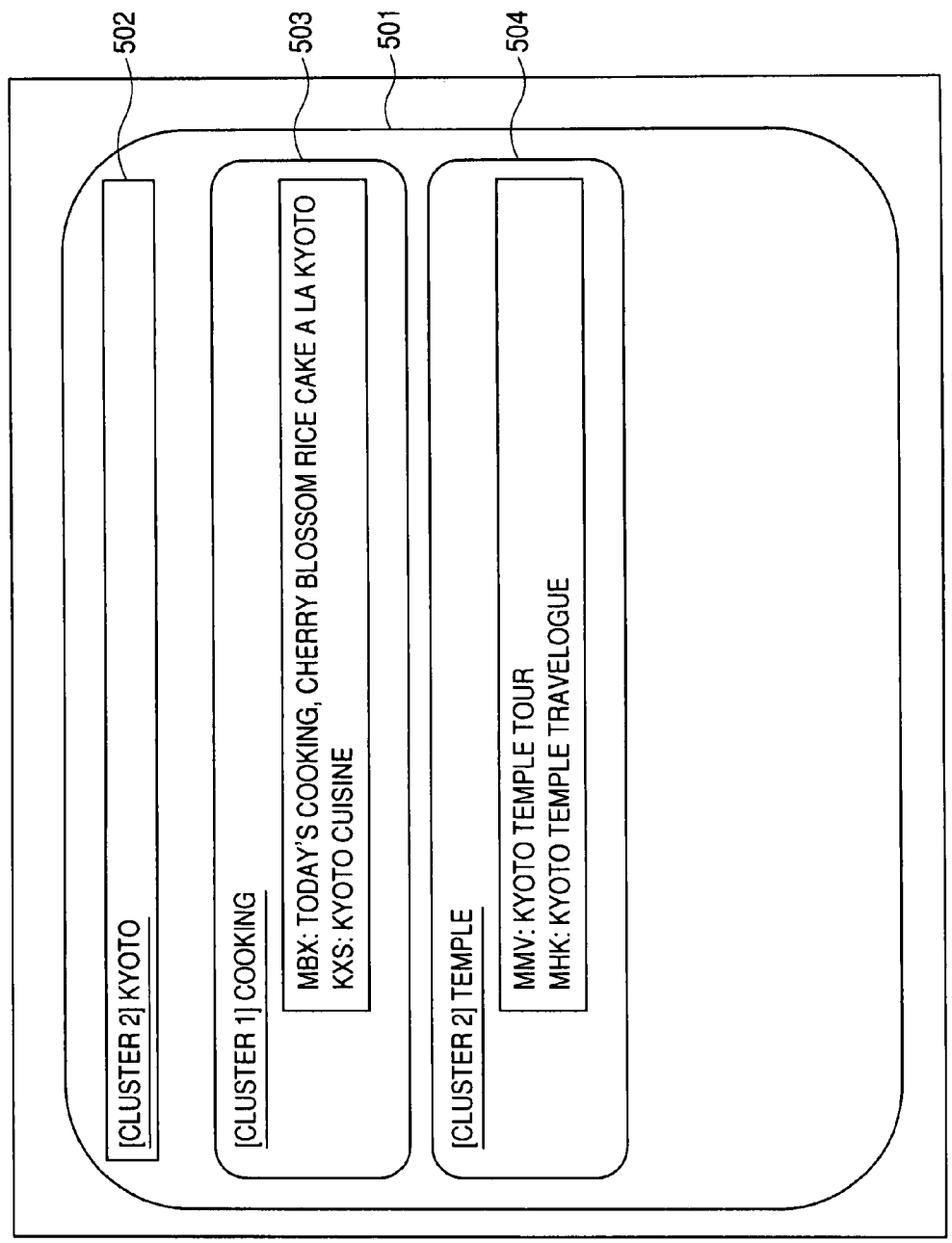
FIG. 19 shows a diagram depicting an exemplary display screen of the result of the clustering process for the selected cluster.

The display control part 204 controls the display controller 112 to display the result of the clustering process on the display 114. FIG. 19 shows an exemplary display screen of the result of the clustering process. On the exemplary screen shown in FIG. 19, a window 501 is displayed in the screen, and windows 502 to 504 are displayed in the window 501. In the window 502, the cluster name of the selected cluster is displayed. In addition, in the window 503 and 504, the individual contents belonging to the selected cluster are classified into every cluster in a lower layer and displayed. In other words, the list of the cluster names of the individual clusters in a lower layer and the broadcast station, title, outline and others of at least a part of the contents among the contents belonging to the individual clusters is displayed.

In addition, in the case in which the number of the clusters is large and the display of the clusters is not contained in a single screen, for example, the display is split into a plurality of screens, or the screen is scrolled, whereby information about all the clusters is displayed.

Therefore, a user can more easily retrieve desired contents among the contents belonging to the selected cluster.

In Step S34, for example, in the case in which a user uses the remote controller 136 to select "register the cluster as a class" from the cluster operating menu and the instruction is supplied to the user instruction acquiring part 201 through the U/I control part 105, the user instruction acquiring part 201 determines that "register the cluster as a class" is selected, and the process goes to Step S45.

In Step S45, the class registering part 257 registers the selected cluster as a class, and the content search process is ended. In other words, the user instruction acquiring part 201 sends a notice to the class registering part 257 that "register the cluster as a class" is selected. The class registering part 257 registers the selected cluster as a new set class in the identification coefficient table. In addition, among the keywords of the individual contents and the score of each of the keywords obtained in the process in Step S1, the class registering part 257 acquires information indicating the keyword of the contents belonging to the selected cluster and the score of each of the keywords from the keyword extracting part 202. The class registering part 257 sets the value of the identification coefficient of a newly registered class based on the score and the frequency of appearance of the keyword of the contents belonging to the selected cluster. In addition, the value of the identification coefficient may be set by a user.

As described above, a new set class can be easily registered.

In Step S35, for example, in the case in which a user uses the remote controller 136 to select "register the degree of favorites of the cluster" from the cluster operating menu and the instruction is supplied to the user instruction acquiring part 201 through the U/I control part 105, the user instruction acquiring part 201 determines that "register the degree of favorites of the cluster" is selected, and the process goes to Step S46.

In Step S46, the taste information registering part 205 registers the degree of favorites of the selected cluster, and the content search process is ended. In other words, the user instruction acquiring part 201 sends a notice to the taste information registering part 205 that "register the degree of favorites of the cluster" is selected. For example, the taste information registering part 205 receives information indicating the degree of favorites of the selected cluster that is inputted from the remote controller 136 by a user through the U/I control part 105 and the user instruction acquiring part 201. For example, the value of the degree of favorites is in seven stages from −3 to +3.

In addition, among the keywords of the individual contents and the score of each of the keywords obtained in the process in Step S1, the taste information registering part 205 acquires information indicating the keyword of the contents belonging to the selected cluster and the score of each of the keywords from the keyword extracting part 202. Among the keyword of the contents belonging to the selected cluster, for the keyword registered in the taste information stored in the taste information storage part 223, the taste information registering part 205 adds the value that the value based on the score and the frequency of appearance of the keyword is multiplied by the degree of favorites, whereas for the keyword not registered in the taste information, it registers the keyword to taste information as well as it sets the value that the value based on the score and the frequency of appearance of the keyword is multiplied by the degree of favorites to the degree of tastes of the keyword.

Therefore, in the case in which the degree of favorites is set to a positive value, the degree of tastes to the keyword of the contents belonging to the selected cluster is set higher depending on the score and the frequency of appearance of the keyword, whereas in the case in which the degree of favorites is set to a negative value, the degree of tastes to the keyword of the contents belonging to the selected cluster is set lower depending on the score and the frequency of appearance of the keyword.

In Step S36, for example, in the case in which a user uses the remote controller 136 to move the cursor 321 so as to select another cluster displayed on the search result display screen and the instruction by that manipulation is supplied to the user instruction acquiring part 201 through the U/I control part 105, the user instruction acquiring part 201 determines that the selected cluster is changed, the process returns to Step S27, and the process steps after Step S27 are performed. In other words, the cluster operating menu for a newly selected cluster is displayed.

In Step S37, for example, in the case in which a user uses the remote controller 136 to move the cursor 321 so as to select an item other than the set class and the cluster displayed on the search result display screen and the instruction by that manipulation is supplied to the user instruction acquiring part 201 through the U/I control part 105, the user instruction acquiring part 201 determines that an item other than the set class and the cluster is selected, and the process goes to Step S47.

In Step S47, as similar to the process in Step S39 described above, the cluster operating menu is deleted. After that, the process returns to Step S5, and the process steps after Step S5 are performed.

In Step S38, for example, in the case in which a user uses the remote controller 136 to move the cursor 321 so as to select one of the set classes displayed on the search result display screen and the instruction by that manipulation is supplied to the user instruction acquiring part 201 through the U/I control part 105, the user instruction acquiring part 201 determines that a set class is selected, the process returns to Step S8, and the process steps after Step S8 are performed. In other words, the class operating menu for the selected set class is displayed.

As described above, the base content is used as the base point to retrieve the relating contents as well as the retrieved contents are classified into the set class or the cluster and represented for a user.

In addition, in the case in which contents are retrieved, it is sufficient that a user only select a base content. Therefore, the convenience is improved more than the case in which a keyword is inputted.

In addition, in the discussion above, an example is described in which the contents to be a target for retrieval and classification are a TV broadcast program. In an embodiment of the invention, metadata indicating the descriptions of the contents, generally referred to as contents, is used for retrieval and classification, including software or hardware usable by users such as movies, photos, music and others (moving images, still images, or sounds, or the combinations thereof), various items of information, documents, commodities (including articles), and conversations. However, in the case in which the contents are in hardware, the article is projected into moving images or still images to be data, and the data is used as a target for retrieval and classification as content data.

In addition, in the discussions above, an example is shown in which the base content is used as a base point to retrieve contents. In an embodiment of the invention, it is possible that a keyword is extracted to retrieve contents from text streams such as text information such as a question inputted by a user, or subtitle information sent through the Internet.

In addition, an embodiment of the invention can be adapted to various devices, systems, or software, which classify, manage and present contents, including various computers, television receivers, recording/reproducing apparatuses, cellular telephones, PDA (Personal Digital Assistants) and so on.

A series of the process steps described above may be executed by hardware, or may be executed by software. In the case in which a series of the process steps is executed by software, a program configuring the software is installed in a computer incorporated in a dedicated hardware, or is installed from a program recording medium to a multi-purpose personal computer, for example, that can run various functions by installing various programs.

Figure 20:
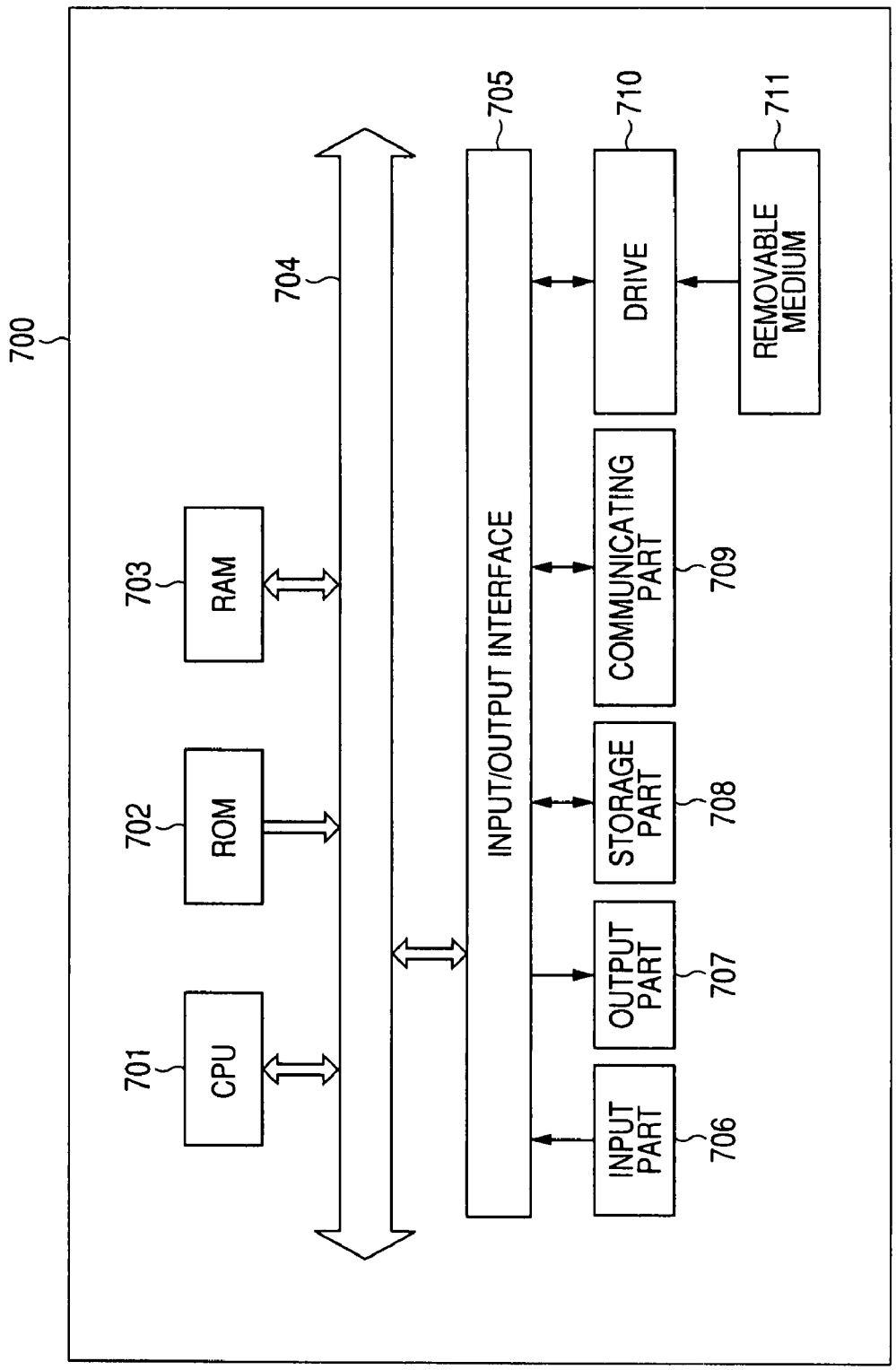
FIG. 20 shows a block diagram depicting an exemplary configuration of a personal computer.

FIG. 20 shows a block diagram depicting an exemplary configuration of a personal computer 700 which executes a series of the process steps by a program. A CPU (Central Processing Unit) 701 runs various process steps in accordance with a program stored in a ROM (Read Only Memory) 702, or a storage part 708. The RAM (Random Access Memory) 703 properly stores the program run by the CPU 701 and data therein. The CPU 701, the ROM 702, and the RAM 703 are connected to each other through a bus 704.

In addition, to the CPU 701, an input/output interface 705 is connected through the bus 704. To the input/output interface 705, an input part 706 formed of a keyboard, a mouse, a microphone and others is connected, and an output part 707 formed of a display, a speaker and others is connected. The CPU 701 executes various process steps in response to an instruction inputted from the input part 706. Then, the CPU 701 outputs the result of the process steps to the output part 707.

The storage part 708 connected to the input/output interface 705 is formed of a hard disk, for example, which stores the program run by the CPU 701 and various items of data therein. A communicating part 709 communicates with external devices over a network such as the Internet and a local area network.

In addition, a program may be acquired through the communicating part 709 and then stored in the storage part 708.

A drive 710 connected to the input/output interface 705 drives a removable medium 711 when it is mounted, such as a magnetic disk, an optical disk, magneto-optical disk, and a semiconductor memory, and acquires a program and data recorded thereon. The acquired program and data is forwarded to the storage part 708 and stored therein, as necessary.

As shown in FIG. 20, the program recording medium is installed in the computer and stores a program that is executable by the computer, and it is configured of the removable medium 711 which is a package medium formed of a magnetic disk (including a flexible disk), an optical disk (including CD-ROM (Compact Disc-Read Only Memory), DVD (Digital Versatile Disc)), a magneto-optical disk, or a semiconductor memory, or the ROM 702 in which a program is stored temporarily or permanently, or a hard disk configuring the storage part 708. The program is stored in the program recording medium through the communicating part 709 which is an interface for a router and a modem by using wire or radio communication media such as a local area network, the Internet, and digital satellite broadcasting, as necessary.

In addition, in the specification, the steps describing the program to be stored in the program recording medium of course include the process steps performed in time series along the described order and also include the process steps performed individually or in parallel not necessarily processed in time series.

Moreover, an embodiment of the invention is not limited to the embodiments described above, which can be modified within the scope not deviating from the teaching of an embodiment of the invention.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus, including a processor, comprising:
   identifying means for identifying a group to which content belongs from one or more predetermined groups based on metadata describing the content; and
   clustering means for clustering a first set of the content that has been not identified and classifying the first set into a cluster based on the metadata,
   wherein the identified group to which the content belongs has a relevance ratio of the content, the value of the relevance ratio of the content being equal to or greater than a predetermined threshold,
      wherein the relevance ratio of the content is calculated based on values of a plurality of keywords of the content, the plurality of keywords of the content matching with identifier words in the identified group.

2. The information processing apparatus according to claim 1,
   wherein the clustering means clusters a second set of the content that belongs to a selected group selected by a user or a selected cluster selected by the user into a second cluster.

3. The information processing apparatus according to claim 1, further comprising:
   retrieving means for retrieving related content that relates to the content that is a base point for retrieval based on the metadata,
   wherein the identifying means identifying a group to which the related content belongs.

4. The information processing apparatus according to claim 1, further comprising a presentation control means for controlling the presentation of the contents after the contents are classified into each of the groups and the clusters.

5. An information processing method, executed by a processor, comprising the steps of:
   identifying a group to which a content belongs from one or more predetermined groups based on metadata describing descriptions of a content; and
   clustering a set of the contents that has not been identified and classifying the set into a cluster based on the metadata,
   wherein the identified group to which the content belongs has a relevance ratio of the content, the value of the relevance ratio of the content being equal to or greater than a predetermined threshold,
      wherein the relevance ratio of the content is calculated based on values of a plurality of keywords of the content, the plurality of keywords of the content matching with identifier words in the identified group.

6. A computer-readable medium storing a computer program executed by a computer, the program comprising the steps of:
   identifying a group to which a content belongs from one or more predetermined groups based on metadata describing descriptions of a content; and
   clustering a set of the contents that has not been identified and classifying the set into a cluster based on the metadata,
   wherein the identified group to which the content belongs has a relevance ratio of the content, the value of the relevance ratio of the content being equal to or greater than a predetermined threshold,
      wherein the relevance ratio of the content is calculated based on values of a plurality of keywords of the content, the plurality of keywords of the content matching with identifier words in the identified group.

7. An information processing apparatus, including a processor, comprising:
   an identifying unit which identifies a group to which a content belongs from one or more predetermined groups based on metadata describing descriptions of a content; and
   a clustering unit which clusters a first set that is a set of the contents that has not been identified and classifies the first set into a cluster based on the metadata,
   wherein the identified group to which the content belongs has a relevance ratio of the content, the value of the relevance ratio of the content being equal to or greater than a predetermined threshold,
      wherein the relevance ratio of the content is calculated based on values of a plurality of keywords of the content, the plurality of keywords of the content matching with identifier words in the identified group.

* * * * *